(12) United States Patent
Hodges et al.

(10) Patent No.: US 7,270,382 B2
(45) Date of Patent: Sep. 18, 2007

(54) WHEEL WITH INCREASED INTERIOR LIP DEPTH

(76) Inventors: Frank J. Hodges, 20624 Mirkwood Run, Yorba Liuda, CA (US) 92887; Sergiu Anca, 12092 Le Ann Dr., Garden Grove, CA (US) 92640

( * ) Notice: Subject to any disclaimer, the term of this patent is extended or adjusted under 35 U.S.C. 154(b) by 0 days.

(21) Appl. No.: 10/970,646

(22) Filed: Oct. 21, 2004

(65) Prior Publication Data
US 2005/0200193 A1    Sep. 15, 2005

Related U.S. Application Data

(60) Provisional application No. 60/572,642, filed on May 19, 2004, provisional application No. 60/526,556, filed on Dec. 3, 2003, provisional application No. 60/513,115, filed on Oct. 21, 2003.

(51) Int. Cl.
*B60B 1/00* (2006.01)
(52) U.S. Cl. ............... 301/63.101; 301/95.101; 152/396
(58) Field of Classification Search ............ 301/3.101, 301/64.101, 64.102, 64.303, 64.203, 63.103, 301/65, 63.106, 63.104, 63.105, 36.1, 95.101; D12/204, 208, 207; 29/894.34; 295/25, 295/27; 152/396
See application file for complete search history.

(56) References Cited

U.S. PATENT DOCUMENTS

| | | | | |
|---|---|---|---|---|
| 1,377 A | * | 10/1839 | Cockley | ............... 295/27 |
| 5,126 A | * | 5/1847 | Whitney | ............... 295/27 |
| 253,797 A | * | 2/1882 | Vincent | ............... 192/46 |
| 1,175,315 A | * | 3/1916 | Smith | ............... 301/64.101 |
| 1,179,768 A | | 4/1916 | Simmons | |
| 1,249,826 A | | 12/1917 | Putnam | |
| 1,257,411 A | * | 2/1918 | Sherman | ............... 295/27 |
| 1,295,792 A | | 2/1919 | Putnam | |

(Continued)

FOREIGN PATENT DOCUMENTS

CH          619895      * 10/1980

(Continued)

OTHER PUBLICATIONS www.aarims.com/cgi-bin/Web-store/web_store.cgi; pp. 7-8, Rozzi Battle wheel for GMC vehicles, site accessed Apr. 27, 2004.

*Primary Examiner*—Russell D. Stormer
(74) *Attorney, Agent, or Firm*—Knobbe Martens Olson & Bear LLP

(57) ABSTRACT

Disclosed are various embodiments of one-piece, and multi-piece wheels configured to provide increased interior lip depth. In one embodiment, an outer periphery of a curved center portion of a wheel is attached to a wheel barrel in an inboard region, and a portion of the center portion extends into the outboard region of the wheel. At least a portion of the wall of the wheel barrel preferably comprises a gradual slope, instead of a traditional wheel mounting drop, and thus the interior lip depth is not obstructed by the interior bulge generally created by such a drop. In other embodiments, a wheel mounting drop is configured to permit multi-piece wheels to be joined at or near one of the drop walls to allow the wheel center to be positioned further in the inboard direction than in traditional wheels.

12 Claims, 23 Drawing Sheets

U.S. PATENT DOCUMENTS

| | | | |
|---|---|---|---|
| 1,380,926 A * | 6/1921 | Putnam | 301/63.101 |
| 1,410,986 A | 3/1922 | Bellamore | |
| 1,470,626 A * | 10/1923 | Kranz | 301/63.101 |
| 1,583,222 A | 5/1926 | Coates | |
| 1,585,401 A * | 5/1926 | Main | 301/63.101 |
| 1,591,003 A * | 6/1926 | Vincent | 295/27 |
| 1,591,501 A * | 7/1926 | Allison | 301/63.101 |
| 1,603,177 A | 10/1926 | Wilhelms | |
| 1,611,975 A | 10/1926 | Williams | |
| 1,627,953 A | 5/1927 | Buquet | |
| 1,640,378 A | 8/1927 | Schoenthal | |
| 1,652,653 A | 12/1927 | Whitcomb | |
| 1,818,448 A * | 8/1931 | Baker | 301/6.91 |
| 1,882,498 A | 10/1932 | Jarvis | |
| 1,993,430 A | 10/1932 | Bell | |
| 1,974,534 A * | 9/1934 | Frank | 301/6.2 |
| 2,017,076 A | 10/1935 | Sauzedde | |
| 2,115,092 A | 4/1938 | Weinberg | |
| 2,182,560 A * | 12/1939 | Higbee | 301/36.2 |
| 2,249,568 A | 7/1941 | Shinliver | |
| 2,265,241 A | 12/1941 | Lyon | |
| D132,028 S | 4/1942 | Davenport | |
| 2,307,335 A | 1/1943 | Reddick | |
| 2,464,348 A * | 3/1949 | Roux | 301/63.102 |
| D158,227 S | 4/1950 | Sinclair | |
| 2,551,783 A | 5/1951 | Ash | |
| 2,584,309 A | 2/1952 | Voorhees | |
| D171,011 S | 12/1953 | Rosenberg | |
| 2,809,869 A | 10/1957 | Forbush et al. | |
| 2,822,218 A * | 2/1958 | Whitfield | 301/6.1 |
| 2,830,168 A | 4/1958 | Taylor | |
| 2,963,326 A | 12/1960 | Wood | |
| D190,640 S | 6/1961 | Hibbard | |
| D190,641 S | 6/1961 | Hibbard | |
| D190,642 S | 6/1961 | Hibbard | |
| D190,644 S | 6/1961 | Hibbard | |
| 3,006,692 A | 10/1961 | Schubert | |
| 3,250,572 A * | 5/1966 | Walker | 301/65 |
| 3,601,450 A | 8/1971 | Baker | |
| 3,612,614 A * | 10/1971 | Ware | 301/43 |
| 3,865,170 A | 2/1975 | Mitchell | |
| 3,974,870 A | 8/1976 | Watts | |
| 3,995,676 A | 12/1976 | Casey | |
| 3,999,588 A | 12/1976 | Mitchell | |
| RE30,436 E | 11/1980 | Casey | |
| 4,280,426 A | 7/1981 | Swan | |
| 4,345,360 A | 8/1982 | Ridout | |
| 4,407,348 A | 10/1983 | Suckow | |
| 4,466,670 A | 8/1984 | Kaji | |
| 4,580,612 A | 4/1986 | Smithkey | |
| 4,585,276 A * | 4/1986 | Tirheimer | 301/36.1 |
| 4,643,484 A | 2/1987 | Luter et al. | |
| 4,770,220 A | 9/1988 | Mori | |
| 4,823,854 A | 4/1989 | Payne et al. | |
| 4,856,849 A | 8/1989 | Fujii et al. | |
| 4,997,235 A | 3/1991 | Braungart | |
| 5,018,566 A | 5/1991 | Thoni | |
| D318,449 S | 7/1991 | Lipper | |
| 5,104,197 A | 4/1992 | Lipper | |
| 5,215,137 A | 6/1993 | Weeks et al. | |
| 5,292,182 A | 3/1994 | Kanazawa et al. | |
| 5,295,304 A | 3/1994 | Ashley, Jr. | |
| 5,301,728 A | 4/1994 | Brown, Jr. et al. | |
| 5,345,676 A | 9/1994 | Ashley, Jr. | |
| 5,380,071 A | 1/1995 | Kier, Jr. | |
| 5,417,476 A | 5/1995 | Hasegawa et al. | |
| 5,429,422 A | 7/1995 | Baldi | |
| 5,435,629 A | 7/1995 | Suzuki | |
| 5,533,260 A | 7/1996 | Kier, Jr. | |
| 5,620,235 A | 4/1997 | Janus | |
| 5,634,271 A | 6/1997 | Lipper | |
| 5,694,687 A | 12/1997 | Coleman | |
| 5,772,801 A | 6/1998 | Baldi et al. | |
| D398,894 S * | 9/1998 | Kelley | D12/208 |
| 5,899,537 A | 5/1999 | Abe et al. | |
| 5,951,114 A | 9/1999 | Marron et al. | |
| 6,024,415 A | 2/2000 | Stach | |
| 6,073,347 A | 6/2000 | Cvijanovic et al. | |
| 6,193,321 B1 | 2/2001 | Cvijanovic et al. | |
| 6,302,493 B2 | 10/2001 | Zemlicka | |
| 6,325,462 B1 | 12/2001 | Hummel et al. | |
| 6,332,653 B1 | 12/2001 | Shimizu et al. | |
| 6,354,667 B1 | 3/2002 | Cochran et al. | |
| 6,457,501 B1 | 10/2002 | Ball | |
| 6,473,967 B1 | 11/2002 | Coleman et al. | |
| 6,547,341 B1 | 4/2003 | Griffin | |
| 6,568,765 B1 | 5/2003 | Augier | |
| 6,595,595 B1 * | 7/2003 | Hui | 301/9.2 |
| 6,598,939 B2 | 7/2003 | Müller | |
| 6,623,086 B1 | 9/2003 | Goodman | |
| 6,869,149 B2 * | 3/2005 | Tanaka | 301/63.104 |
| 2001/0026094 A1 * | 10/2001 | Bhambra | 301/65 |
| 2002/0101112 A1 | 8/2002 | Gatton et al. | |
| 2003/0209937 A1 | 11/2003 | Tanaka | |

FOREIGN PATENT DOCUMENTS

| | | |
|---|---|---|
| DE | 36 30 226 A1 | 3/1987 |
| EP | 0 427 607 A1 | 5/1991 |
| EP | 0 427 607 B1 | 5/1991 |
| EP | 0 964 795 B1 | 12/1999 |
| EP | 1 175 304 B1 | 1/2002 |
| GB | 2080212 * | 2/1982 |
| JP | 62096101 A | 5/1987 |
| JP | 04321401 A | 11/1992 |
| WO | WO84/01747 | 5/1984 |
| WO | WO 01/54924 A1 | 8/2001 |

* cited by examiner

WHEEL WITH INCREASED INTERIOR LIP DEPTH

CLAIM OF PRIORITY

This application claims priority to U.S. Provisional Patent Application No. 60/513,115, filed Oct. 21, 2003, U.S. Provisional Patent Application No. 60/526,556, filed Dec. 3, 2003, and U.S. Provisional Patent Application No. 60/572,642, filed May 19, 2004, each of which is hereby incorporated by reference in its entirety.

BACKGROUND OF THE INVENTION

1. Field of the Inventions

The present application relates to wheels for supporting vehicles, and in particular, to wheels with increased interior lip depth between the outboard edge of the wheel and the face of the central portion of the wheel.

2. Description of the Related Art

Consumers have increasingly sought to add style and distinctiveness to their vehicles by buying specially-designed wheels. Recently, wheels with increased interior lip depth (i.e., the distance between the outboard edge of the wheel and the face of the central portion of the wheel) have been gaining in popularity. Also, larger-diameter wheels mounted within low-profile tires have been in high demand. However, certain wheel performance requirements relating primarily to load-bearing capabilities, comfort of ride, and positioning of the vehicle brakes and other functional components, have been viewed as severely limiting the size of the interior lip depth and the outboard wheel diameter, which in turn have placed rigid constrains on the design area and volume on the outboard side of the wheel. Moreover, the relatively small interior lip depth on traditional wheels has minimized the reflective effect of the central wheel face onto the generally shiny surface of the interior lip. The foregoing deficiencies, and others, have been overcome in various embodiments of the inventions disclosed herein.

SUMMARY OF THE INVENTIONS

The various embodiments of the present application have several features, no single one of which is solely responsible for their improved aspects and/or novelty. Without limiting the scope of this disclosure, some of the novel features will now be discussed briefly.

Certain embodiments of the disclosed inventions are one-piece wheels having an increased interior lip depth. Other embodiments are wheels of multi-piece construction. In some embodiments, preferred interior lip depth is achieved with a highly curved center portion that attaches to the wheel barrel in a region positioned toward the inboard side of the wheel. Interior lip depth may be further increased by, for example, appropriately angling the barrel slope, resulting in a generally frustoconical barrel. In certain embodiments, the junction between the wheel center and the barrel is positioned further toward the inboard side of the wheel, as compared to traditional wheels, by a modified mounting drop. In multi-piece wheels, this generally avoids interference between the mounting drop and the bolts holding a multi-piece wheel together. Certain preferred embodiments combine one or more of these features with other disclosed features to achieve many aesthetic and functional improvements over the wheels of the prior art.

DETAILED DESCRIPTION OF THE PREFERRED EMBODIMENTS

When mounted on a vehicle, a wheel has an "inboard" side that faces the interior of the vehicle and an "outboard" side that faces away from the vehicle. As used herein, a feature that extends "radially outwardly" extends from a point, line, or surface closer to the wheel's axis of rotation or symmetry to a point, line, or surface farther away from the wheel's axis of rotation. Conversely, a feature that extends "radially inwardly" extends from a point, line, or surface farther from the wheel's axis of rotation or symmetry to a point, line, or surface closer to the wheel's axis of rotation. In addition, as used herein, terms relating to circles and cylinders, such as "circular," "cylindrical," "diameter," "radius," and "concentric," are not limited to perfectly round structures. Rather, generally circular shapes, including those with large radial protrusions or indentations are also encompassed by these terms.

Figure 1:
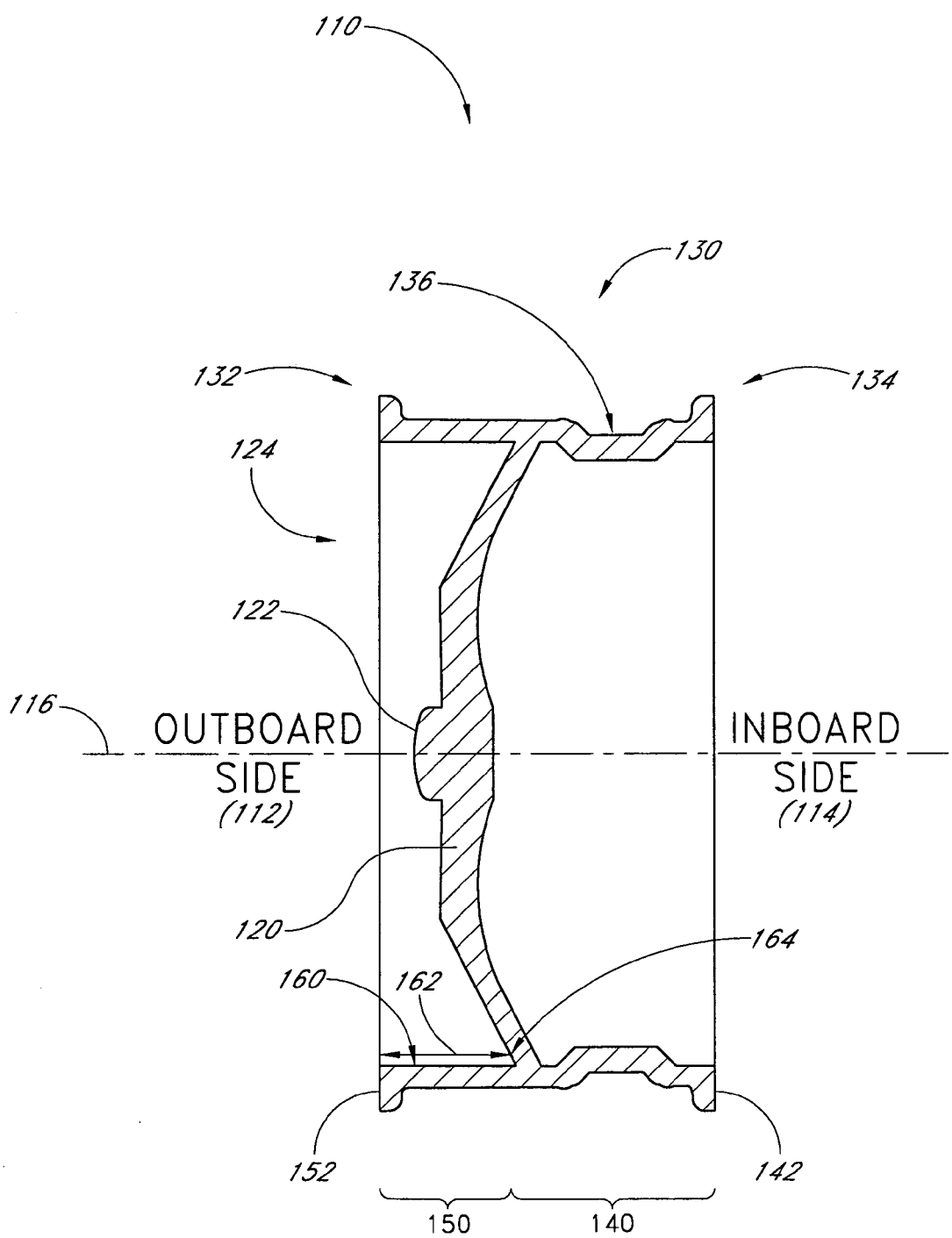
FIG. 1 illustrates a cross-sectional view of a one-piece wheel.

FIG. 1 shows a cross-sectional view of a one-piece wheel 110. The wheel 110 has an outboard side 112 and an inboard side 114, and is generally rotationally symmetrical about an axis 116. The wheel 110 has a center 120 and a wheel barrel 130. The center 120 has an outboard face 122 having a wheel face design 124. The center 120 (sometimes referred to as the central hub or "spider") extends between and integrally joins with the axis-facing (radially inward-facing) surface of the wheel barrel 130.

The wheel barrel 130 is disposed radially outwardly from the center 120 and comprises an inner 140, located generally on the inboard side of the wheel from the center 120, and an outer 150, located generally on the outboard side of the wheel from the center 120. The wheel barrel 130 is approximately cylindrical in shape and is generally rotationally symmetrical about an axis of symmetry 116. An outboard rim 132 extends radially outwardly from the outboard edge of the wheel barrel 130 away from the axis 116. Similarly, an inboard rim 134 extends radially outwardly from the inboard edge of the wheel barrel 130 away from the axis 116. The outboard, axis-facing (interior) surface of the wheel barrel 130 forms a lip 160. The lip 160 has an interior lip depth 162 comprising the distance along a line parallel to the axis 116 from the outboard edge 152 of the wheel 110 to the point 164 where the center 120 joins the wheel barrel 130. In FIG. 1, a mounting drop 136 forms a discrete groove in the outer 150 and a corresponding axially inward-facing bulge in the wheel barrel 130.

Traditional multi-piece wheels have a shape generally similar to that of the one-piece wheel 110 shown in FIG. 1, but multi-piece wheels often have barrels that are divided into separate, detachable outboard and inboard portions, called the "outer" and "inner," respectively. The center can be integral with the outer or inner, or it can be a separate piece. When the outer, inner, and center are all separate components, the wheel is referred to as a "three-piece" wheel. When the center and the outer form a single piece, or the center and inner form a single piece, such configurations are referred to as "two-piece" wheels. The various components that make up a multi-piece wheel must generally be secured together (using bolts or welding, for example) to function correctly as a wheel.

In general, two- and three-piece wheels are more expensive than one-piece wheels and are targeted at consumers who drive more expensive vehicles. The higher price of multi-piece wheels is due to increased manufacturing costs per piece, lower sales volume, and high perceived consumer value. One-piece wheels are generally made with expensive, high-volume casting equipment that can produce many wheels cheaply, once configured appropriately. The investment in tooling-up for manufacturing one-piece wheels is high, but the high volume produced eventually makes the cost per wheel low. In contrast, the components of two- and three-piece wheels are typically separately machined from blocks of alloy metal known as billets. This lower-volume manufacturing approach can be cost-effective because it is generally less expensive to re-tool for this approach than it is to re-tool the high-volume casting equipment.

In traditional wheels, the orientation of the lip and configuration of the wheel barrel has limited the volume available for interior designs on the wheel in the region axially inwardly of the wheel barrel. In other words, because traditional wheels have had a lip angle of approximately zero degrees—corresponding to a generally cylindrical shape—design volume has been more limited. Indeed, wheel barrels and their radially inward surfaces, or lips, have had generally constant radii along their rotational axes, with only small variations such as with a smaller-radius portion that corresponds to the groove or mounting drop. These non-tapered lips have been the norm for many years.

Generally flat, disk-shaped wheel centers, combined with the presence of mechanical components adjacent to the wheel axle, have traditionally caused other limitations on volume and surface area available for design within one- or multi-piece wheels. For example, in certain vehicles, especially front-wheel-drive vehicles with a significant outboard offset on the brake components, it is very difficult to produce an interior lip of any significant size because the volume requirements for the mechanical components on the inboard side of the wheel face are far too great. Typically, a volume of space between the inboard side of the wheel and the wheel center has been reserved to enclose and hide from view the various mechanical components clustered near the vehicle axle. On the other hand, because wheel centers often have been generally flat or disk-shaped, the volume of space enclosed around the periphery of such components has been greater than necessary.

Also, in most wheels, the mounting drop has been located in the middle or on the inboard side of the wheel center. This has insured that the axially-protruding bump on the interior of the wheel that corresponds to the mounting drop has not obscured the wheel face from view, but this configuration has also limited the depth of the interior lip and the wheel's design volume (the space available for visible wheel design between the outboard side of the wheel and the wheel center). Thus, the mounting drop groove has traditionally been an obstacle to a greater interior lip depth. Indeed, in the typical multi-piece wheel, the bolt at the junction of the wheel center and the wheel barrel extends toward the inboard side of the wheel barrel, limiting the inboard/outboard depth at which the wheel center junction can be placed without the bolt abutting the mounting drop.

The traditional shape of the mounting drop has been another design limitation. The typical mounting drop has in the past been formed as a distinct groove with two walls. The mounting drop has generally been entirely contained within a single region of the wheel barrel; the mounting drop groove, including its two substantially vertical walls, has been formed continuously with no seams in the metal surface. That is, the junction between the inner, outer, and/or center has not overlapped with any region of the mounting drop.

Figure 2A:
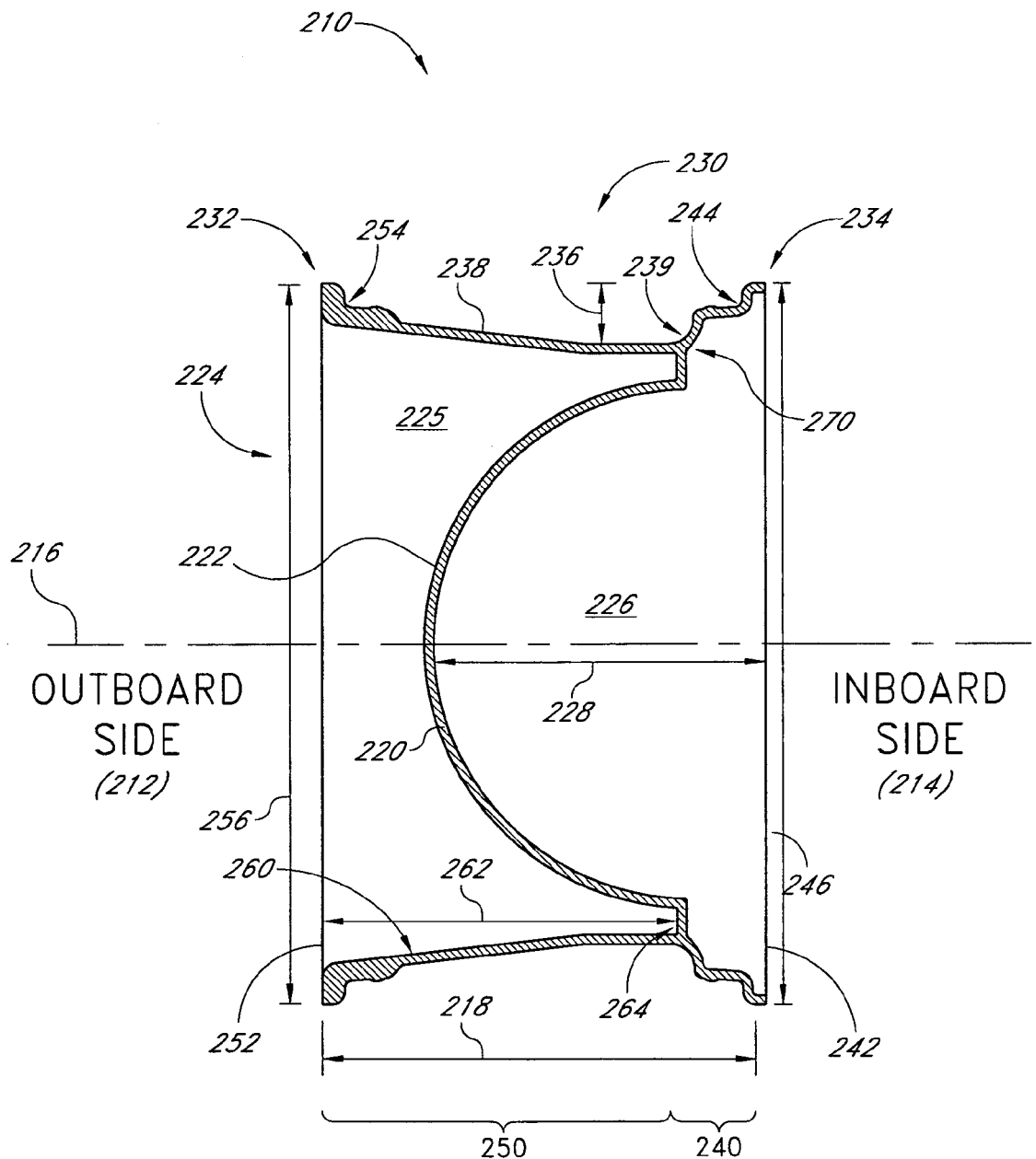
FIG. 2A illustrates a cross-sectional view of a one-piece wheel in accordance with an embodiment of the disclosed inventions.

FIG. 2A illustrates a one-piece wheel in accordance with an embodiment of the disclosed inventions. The one-piece wheel 210 comprises a center 220, and a wheel barrel 230, having an inner 240 and outer 250. In the illustrated embodiment, the wheel barrel 230 and center 220 are integrally formed, having a junction 270. The wheel 210 has a generally outboard side 212, a generally inboard side 214, an outboard edge 252, an inboard edge 242, and a width therebetween 218. The wheel 210 is generally rotationally symmetrical about the axis 216. The wheel 210 is designed to rotate generally about the axis 216 when in use as a vehicle wheel.

Figure 2B:
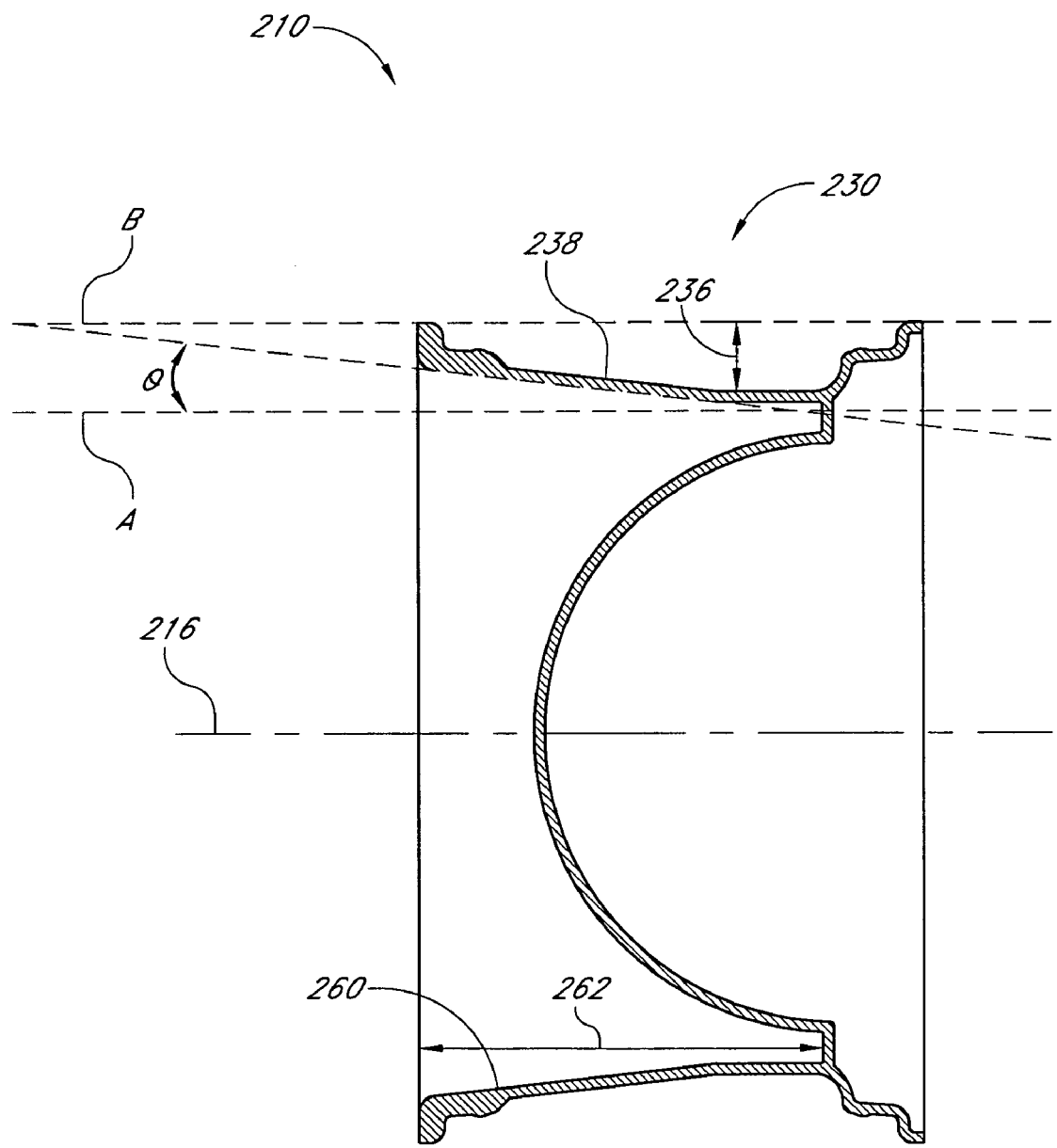
FIG. 2B illustrates the angle of the lip of the embodiment of FIG. 2A.

The wheel center 220 comprises a wheel face 222, which may be decorated with a wheel face design 224 (as seen more fully in FIG. 2B). The wheel center 222 is also preferably curved to form a generally convex shape when viewed from the outboard side 212, or to form a generally concave shape when viewed from the inboard side 214. This curvature creates a cavity 226 to the inboard side 214 of the center 220, having a width 228. The cavity 226 is configured to accommodate various components of the vehicle. Such components may include the wheel hub and axle in the vehicle, the brake calipers, pads, and/or drums, and other mechanical or structural components on the vehicle, none of which are illustrated. The center 220 may be configured to connect or interface with the vehicle components that are disposed within the cavity 226. The center 220 is preferably formed from metal such as aluminum or steel or alloys thereof, and it is configured to provide—in concert with the barrel 230 and with the other vehicle wheels—sufficient structural strength and rigidity to bear the weight of a vehicle.

The outboard surface of the center 220 comprises the wheel face 222. The wheel face 222 may comprise a decorative, highly reflective layer of metal such as chrome and may be applied through an electrical or chemical plating process. The wheel face 222 is configured to display a wheel face design 224 that can be viewed from the outboard side 212 of the vehicle. In accordance with the wheel face design 224, the wheel face 222 may comprise such decorative structures as multiple spokes, hollows, flanges, contours, surfaces, loops, stars, rays, decorative lines, etc. Thus, the true cross-section along a given plane of the center 220 may not actually be a continuous surface as illustrated in FIG. 2A. The center 220 is illustrated in cross-section merely to show the general presence of a center 220 in this embodiment and its general shape, though the center may contain interrupted lines representing grooves, hollows, or spaces in any given cross-sectional plane. The center 220 can be adorned with any design or combination of designs.

The curvature of the center 220 need not be as smooth or spherical as illustrated by FIG. 2A, but may have a variety of other shapes. For example, the center could be alternatively conical and therefore lack substantial curvature in a cross-sectional plane except at a point centered on the axis 216, or the center could have an irregular shape. The curvature of the center can be specifically configured to maximize the design volume available to the wheel face designer. For example, the wheel center can be contoured to just avoid contact with the vehicle components near the wheel axle as the wheel rotates. Advantageously, the contours of the wheel center 220 can be adapted to enhance the reflection of the wheel center 220 in the lip 260. Likewise, the contours of the wheel center 220 can be adapted, along with the angle of the lip 260, to maximize the interior lip depth 262. In one preferred embodiment, the ratio of the wheel width 218 to the cavity width 228 is preferably approximately 1.25 to 1. In one embodiment with a 22-inch wheel face, this corresponds to a wheel width 218 of approximately 9.5 inches and a cavity width 228 of approximately 7.5 inches. Of course, various embodiments of the inventions disclosed herein may include different ranges of such proportions. For example, the ratio of the wheel width 218 to the cavity width 228 may be 3 to 1, 2.75 to 1, 2.5 to 1, 2.25 to 1, 2 to 1, 1.75 to 1, 1.5 to 1, 1.25 to 1, 1.2 to 1, 1.15 to 1, 1.1 to 1., 1.05 to 1, and even 1 to 1.25 or larger, for wheels wherein at least a portion of the wheel face 222 extends further in the outboard direction than the outboard rim 232.

In certain embodiments, the center 220 only bulges to the outboard side to the extent needed to allow the minimum amount of space for the axle-related vehicle components. Additionally, the center 220 may attach to the barrel 230 at any point along the barrel surface. The center may comprise any number of spokes of integral or separate construction. The center 220 may also be a separate piece that is later attached to the wheel barrel. For examples of embodiments with such a separately-constructed center, see the figures and descriptions below.

The wheel barrel 230 comprises an outboard rim 232, an outboard bead seat 254, a slope 238, an inboard bead seat 244, and an inboard rim 234. The barrel extends in a direction generally parallel to the axis 216 from an outboard edge 252 at the outboard side 212 of the wheel 210 to an inboard edge 242 at the inboard side 214 of the wheel 210. The outboard rim 232 and outboard bead seat 254 are configured to interface with the outboard bead of a tire (not shown) in a standard way. Similarly, the inboard bead seat 244 and inboard rim 234 are configured to interface with the inboard bead of a tire (not shown). The tire with which the wheel interfaces may be any kind of tire, including a specially-formed tire. In a preferred embodiment, the wheel is configured to interface with a conventional tire with inboard/outboard symmetry readily available on the market. In another preferred embodiment, the wheel is configured to interface with a low-profile tire.

In the illustrated embodiment, the wheel's outboard diameter 256 is the same as its inboard diameter 246. The wheel barrel 230 slopes from a greater diameter toward the outboard side 12 to a lesser diameter toward the inboard side 214. Thus, the wheel barrel 230 forms a generally frusto-conical shape rather than the generally cylindrical shape of the wheel barrel 130. In this example, the wheel barrel 230 is configured such that the rim 234 and the rim 232 each extend to the same ultimate diameter away from the axis 216. Likewise, bead seat 254 has the same diameter as bead seat 244. But as seen from the cross-sectional view of the wheel 210, the general shape of the barrel 230 is similar to the hollow frustum of a cone. In certain preferred embodiments, the wheel has a diameter 256 ranging from approximately 14 inches to approximately 28 inches. In general, wheels are sold in diameters of one-inch increments over this range. A preferred embodiment has a diameter 256 of approximately 22 inches. Of course, wheel diameters within and beyond these ranges are also encompassed by various embodiments of the present inventions.

Alternatively, the wheel's outboard diameter 256 may differ from its inboard diameter 246. For example, the wheel may have an extended flange as disclosed in U.S. patent application Ser. No. 10/266,040, which is hereby incorporated by reference for all that it discloses. For example, the difference between the inboard diameter 246 and the outboard diameter 256 of the wheel 210 may be 1 inch, 1½ inches, 2 inches, 2½ inches, 3 inches, 3½ inches, or 4 inches. Of course, additional sizes within and beyond these ranges are also encompassed by various embodiments of the present inventions.

In one embodiment, the slope 238 is generally smooth and gradual, sloping from the outboard bead seat 254 in an axially inward manner to the junction 270. The slope 238 may be approximately linear, or, as illustrated in FIG. 2A, the slope may lessen or increase, forming a region that slopes in a generally downward, but non-uniform way.

The apical end of the generally frustoconical shape is preferably toward the inboard side 214 of the wheel barrel 230. In the illustrated embodiment, toward the inboard side, a wall 239 slopes abruptly away from the axis toward the bead seat 244 (FIG. 2A). But near where the slope 238 and the wall 239 meet, the diameter of the outer surface of the barrel 230 is preferably at a minimum. This region of the barrel functions as an effective mounting drop, having a drop depth 236.

The wheel barrel 230 need not contain a discrete mounting drop with well-defined walls, such as mounting drop 136 illustrated in FIG. 1. Rather, the inboard end of the slope 238 and the wall 239 preferably form a groove-like region that can function as a mounting drop. The drop depth 236 is designed to allow a tire mounting tool to be inserted at the proper angle to allow a tire to be mounted on the wheel 210. In this configuration, the tire can be mounted in the conventional way, even though the wheel barrel 230 does not have a conventional mounting drop such as the mounting drop 136 of the tire 110. The generally vertical height of the wall 239 is preferably at least about 1 inch, but may be larger or smaller depending upon the combination of features in a particular embodiment.

The axially facing surface of the outer 250 of the wheel barrel. 230 is labeled in FIG. 2A as the lip 260. The lip 260 is generally visible from the outboard side 212 of the wheel 210, just as the wheel face 222 and wheel face design 224 are visible from the outboard side 212. The lip 260 may be considered part of the wheel face design 224. The lip 260 has an interior lip depth 262 measured from the outboard edge 252 of the wheel 210 to the point 264 at the junction 270 where the center 220 joins the wheel barrel 230. The interior lip depth 262 is illustrated as the depth would be measured along a line parallel to the axis 216. Like the wheel face 222, the lip 260 can be chromed, polished, decorated, colored, etched, embossed, layered, or otherwise designed to create the desired design effect. Preferably, the lip 260 coordinates with and complements the decorative aspects of the wheel face 222 to create a unified and aesthetically pleasing complete wheel face design 224.

Preferably, the interior lip depth 262 is configured to enhance the wheel design features by creating a relatively large depth and volume of design space. As illustrated in FIG. 2A, the interior lip depth 262, which preferably corresponds to the width of the outer 250, occupies a greater proportion of the total wheel width 218 than does the inner 240 in this embodiment. Indeed, the interior lip depth 262 extends well beyond the midpoint between the outboard edge 252 and the inboard edge 242, almost reaching the inboard edge 242. This proportion is also illustrated by the large difference between the width of the outer 250 and the width of the inner 240.

In the illustrated embodiment, the interior lip depth 262 is allowed to be so deep partly because of the configuration of the center 220. The high curvature of the center 220 allows the junction 270 to approach the inboard edge 242 of the wheel barrel 230. Such a highly curved center 220 allows sufficient room to enclose the mechanical components surrounding the vehicle axle, while at the same time utilizing, for design purposes, the unused peripheral space not occupied by the mechanical components, as explained previously in relation to the cavity 226. The combination of the angled lip 260 and the curved center 220 allows for a greater interior lip depth 262, a deeper design volume, and a general improvement in the wheel face design 224.

In one preferred embodiment, the ratio of the wheel width 218 to the interior lip depth 262 is approximately 1.35 to 1. In one embodiment of a wheel with a 22-inch face, this corresponds to a wheel width 218 of approximately 9.5 inches and an interior lip depth 262 of approximately 7 inches. Of course, various embodiments of the inventions disclosed herein may include different ranges of such proportions. For example, the ratio of the wheel width 218 to the interior lip depth 262 is ideally as close as possible to 1 to 1 because this ratio provides the maximum possible interior lip depth. Other examples of such ratios include at least 1.05 to 1, 1.1 to 1, 1.15 to 1, 1.20 to 1, 1.25 to 1, 1.5 to 1, 1.75 to 1, or 2 to 1, or larger.

The drop depth 236, the slope 238, and the angle θ of the lip 260 may be interrelated. In certain embodiments, they are related as illustrated in FIG. 2B. Line A is parallel to the axis 216. Line B corresponds to the surface of the lip 260. Angle θ is the angle between lines A and B. Drop depth 236 is less than, but closely related to the hypotenuse of the angle θ. Thus, the slope 238 and the angle θ of the lip 160 are generally related, in part, to the drop depth 236 needed to effectively mount the tire.

When the thickness of the barrel 230 is approximately uniform along slope 238, line B corresponds to the slope 238, as well as the slope of the lip 260. The angle θ of the lip 260 need not precisely match the angle of the slope 238, and the two surfaces need not be exactly parallel. However, the two surfaces are preferably angled in a somewhat complementary way since they are the opposite outer surfaces of the solid wheel barrel 230, which is preferably solid. As in the illustrated embodiment, the slope of the lip 260 is preferably approximately parallel to the slope 238. In the illustrated embodiment, the angle θ of the slope 238 of the barrel 230 is about 6.5 degrees, as measured from a line parallel to the axis 216. In certain preferred embodiments, the angle θ of the slope 238 of the barrel 230 is at least approximately 5 degrees, as measured from a line parallel to the axis 216 such as line A. Of course, angle θ can have many other values within or beyond these ranges. For example, angle θ may be at least 2 degrees, at least 4 degrees, at least 8 degrees, at least 10 degrees, or at least 15 degrees. Angle θ is preferably less than about 45 degrees.

Figure 2C:
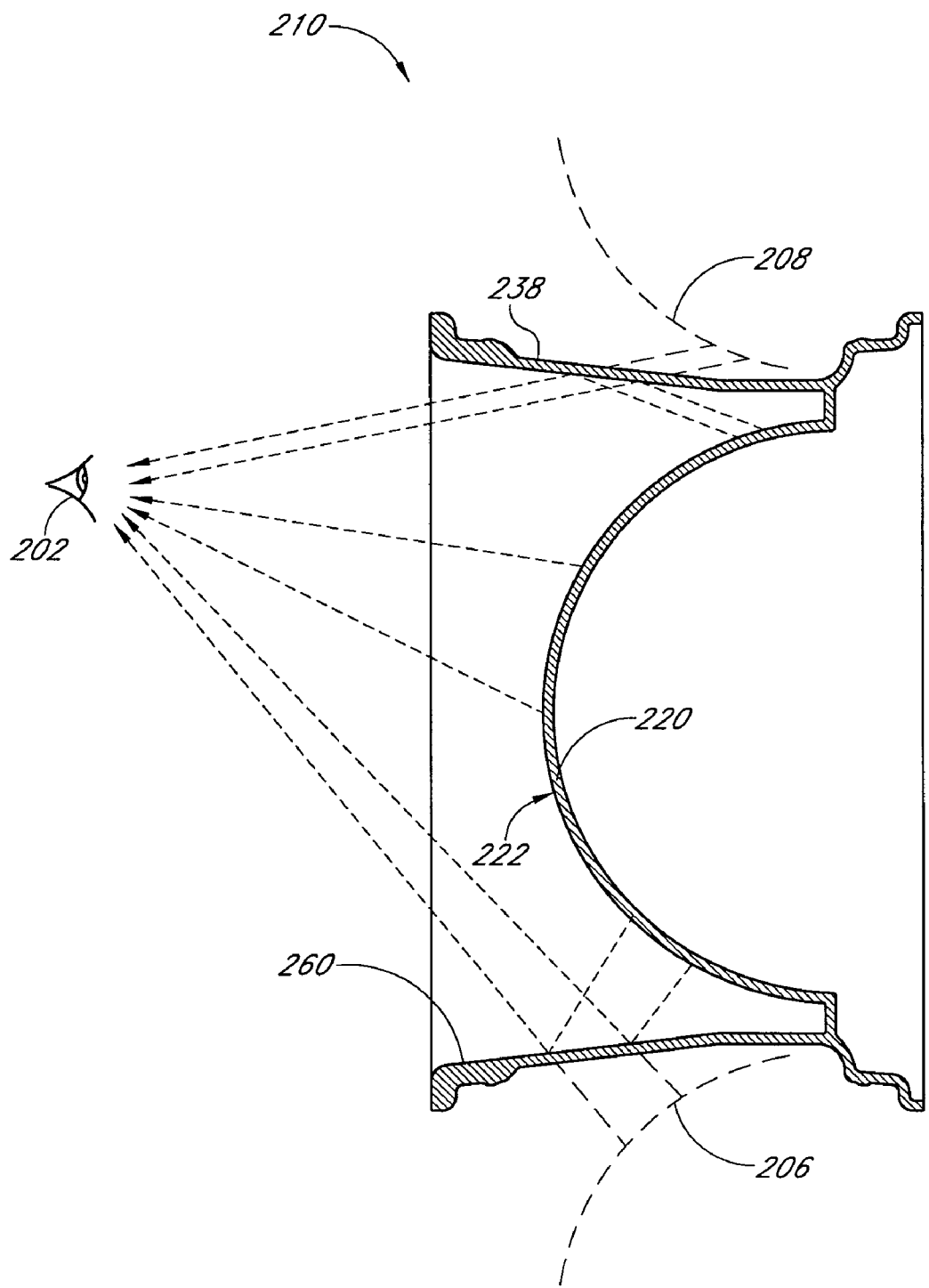
FIG. 2C illustrates reflection from the lip of the embodiment of FIG. 2A.

Preferably, the lip 260 provides a reflective surface in which elements of the wheel face 222 can be seen by a viewer at the outboard side 212 of the wheel 210. FIG. 2C schematically illustrates such a reflective effect. It shows a few exemplary rays of light 204 that result in an image 206 of the wheel center 220 that is visible to the viewer 202 in the lip 260. Virtual images 206 and 208 extend beyond the wheel's true boundaries. Thus, the contours of the curved center 220 and the angled lip 260 advantageously extend the design effect of the wheel 210. Many advantageous complementary relations between the angle θ and the curvature of the center 220 are possible. Preferably, these complementary angles are chosen to enhance the visibility of the reflection and improve the general appearance of the wheel and wheel face design 224.

Figure 2D:
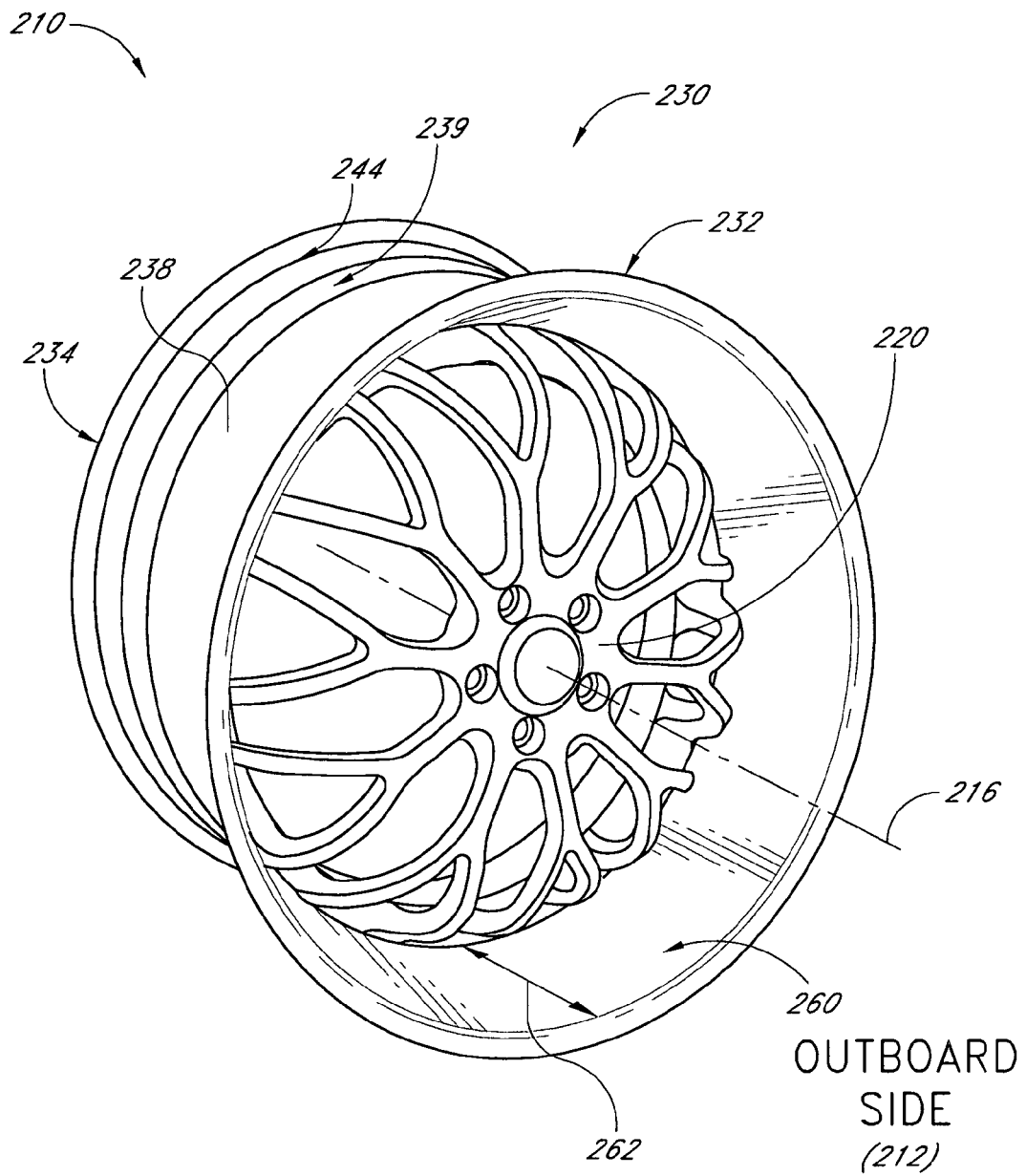
FIG. 2D illustrates a perspective view of the embodiment of FIG. 2A.

FIG. 2D is a perspective view of the embodiment of FIG. 2A, illustrating the wheel 210 as viewed generally from the outboard side 212. The appearance of the wheel is enhanced in this embodiment by the smooth, deep lip 260, as well as the highly-curved, protruding center portion 220 of the wheel 210. Other features visible from this perspective are the inboard rim 234, the inboard bead seat 244, the wall 239, the slope 238, and the outboard rim 232. Also illustrated is the barrel 230, interior lip depth 262 and the axis 216 about which the wheel 210 is generally rotationally symmetrical.

Figure 3A:
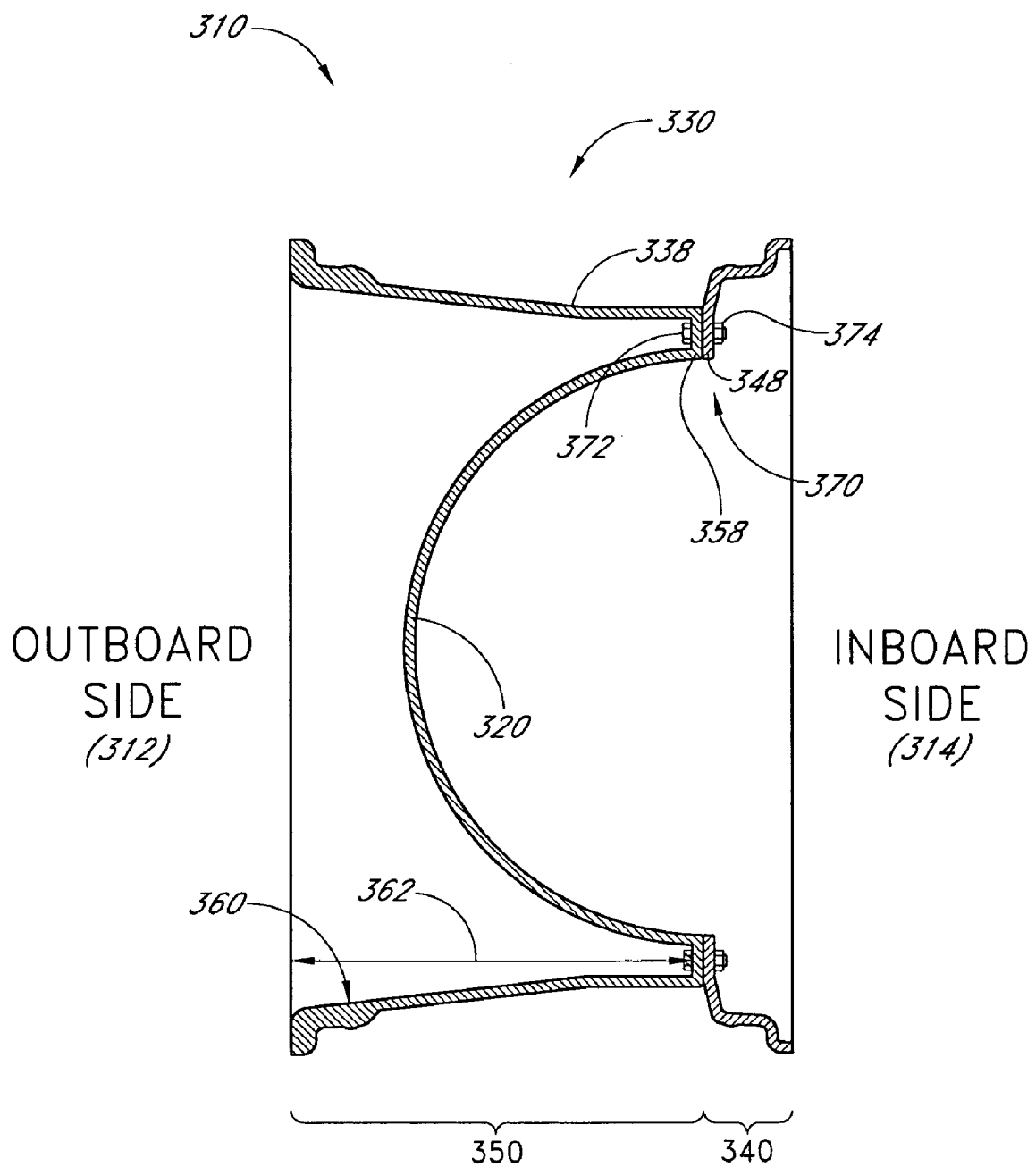
FIG. 3A illustrates a cross-sectional view of an embodiment of a two-piece wheel.

FIG. 3A illustrates a cross-sectional view of an embodiment of a two-piece wheel in accordance with the disclosed inventions. The two-piece wheel 310 comprises an inner 340 and an outer 350. The outer 350 is combined with and forms an integral unit with a center 320. In the illustrated embodiment, the inner 340 and the outer 350 are separate pieces, having a junction 370 where the inner 340 and the outer 350 converge. In the region of the junction 370, the outer 350 has a seat 358, the inner 340 has a rim 348, and the pieces are preferably held together by at least one bolt 372. Each bolt 372 preferably has a corresponding nut 374 that can be tightened to hold the inner 340 and outer 350 snugly together. Bolts similar to bolt 372 are preferably disposed at intervals around a perimeter of the wheel 310 inside (closer to the axis than) the wheel barrel 330.

As with the wheel illustrated in FIG. 2, the cross-section shown in this illustration is rotationally symmetrical around an axis (not shown), and has an inboard side 314 and an outboard side 312. As with the embodiment illustrated in FIG. 2, the two-piece wheel 310 has a gradual slope 338, a protruding center 320, a smooth lip 360 and an interior lip depth 362. In the embodiment of FIG. 3A, the heads of bolts 372 are somewhat visible from the outboard side 312. However, the bolts 372 are preferably somewhat inconspicuous for two reasons: 1) the bolts 372 are located so far towards the inboard side 314 due to the interior lip depth 362; and 2) the bolts 372 are obscured by the protruding center 320.

In a variation of the embodiment illustrated in FIG. 3A, bolt 372 penetrates through the integrated outer 350 and center 320 specifically through the seat 352, but does not protrude completely through the inner 340. Rather, the bolt can be imbedded within a thicker rim 348 that has been tapped such that the threads of the bolt 372 can screw directly into the thicker rim, thus eliminating the need for the nut 374. In another variation of the embodiment of FIG. 3A, the bolt can be inserted from the inboard side, penetrate the rim 348, and be completely received by a thicker seat. This alternative configuration has the advantage that the bolt does not penetrate through to be seen from the outboard side 312 of the two-piece wheel 310. Of course, it is also contemplated that other ways of attaching the multi-piece wheels disclosed herein can be advantageous. For example, a suitable adhesive, a metal weld, or interlocking mechanical grooves and protrusions can be employed in the place of the illustrated bolts. These alternative methods and structures for joining the pieces of a multi-piece wheel, along with all those known to those of skill in the art, are within the scope of this disclosure.

In a preferred embodiment, the wheel 310 has a resilient seal (not shown) between the seat 358 and rim 348 that aids in creating a relatively air-tight chamber (not shown) when a tubeless tire (not shown) is mounted on the wheel 310. For example, the seal can be a of separate construction, in the shape of an "o-ring," or it can be a silicone layer that is squeezed from a tube into the space between the inner 340 and the outer 350 at or near the junction 370. The seal can be any substance and applied according to any of the many methods known by those of skill in the art. Throughout this application, seals are not illustrated, but a preferred embodiment of each of the multi-piece wheels disclosed herein includes a seal.

Figure 3B:
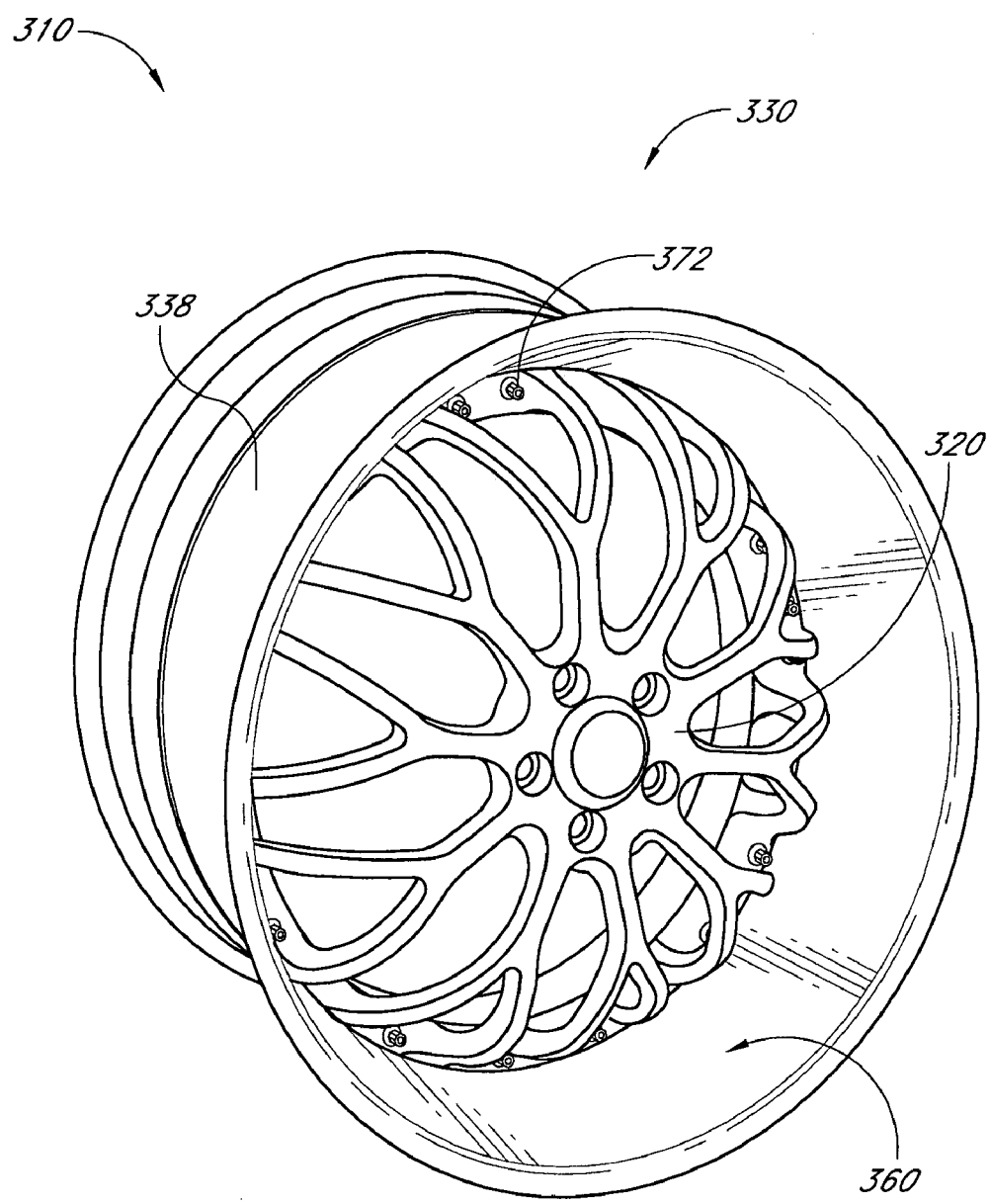
FIG. 3B illustrates a perspective view of the embodiment of FIG. 3A.

FIG. 3B illustrates a perspective view of the embodiment of FIG. 3A showing the wheel 310 as viewed generally from the outboard side 312. In some embodiments, the two-piece construction of the wheel 310 may not be immediately evident from a perspective view, but the multi-piece construction is in the illustration. Bolts 372 can be seen between the design contours of the center 320. Furthermore, the seam between the inboard and outboard portions of the barrel 330 is shown to the inboard side of slope 338.

Figure 3C:
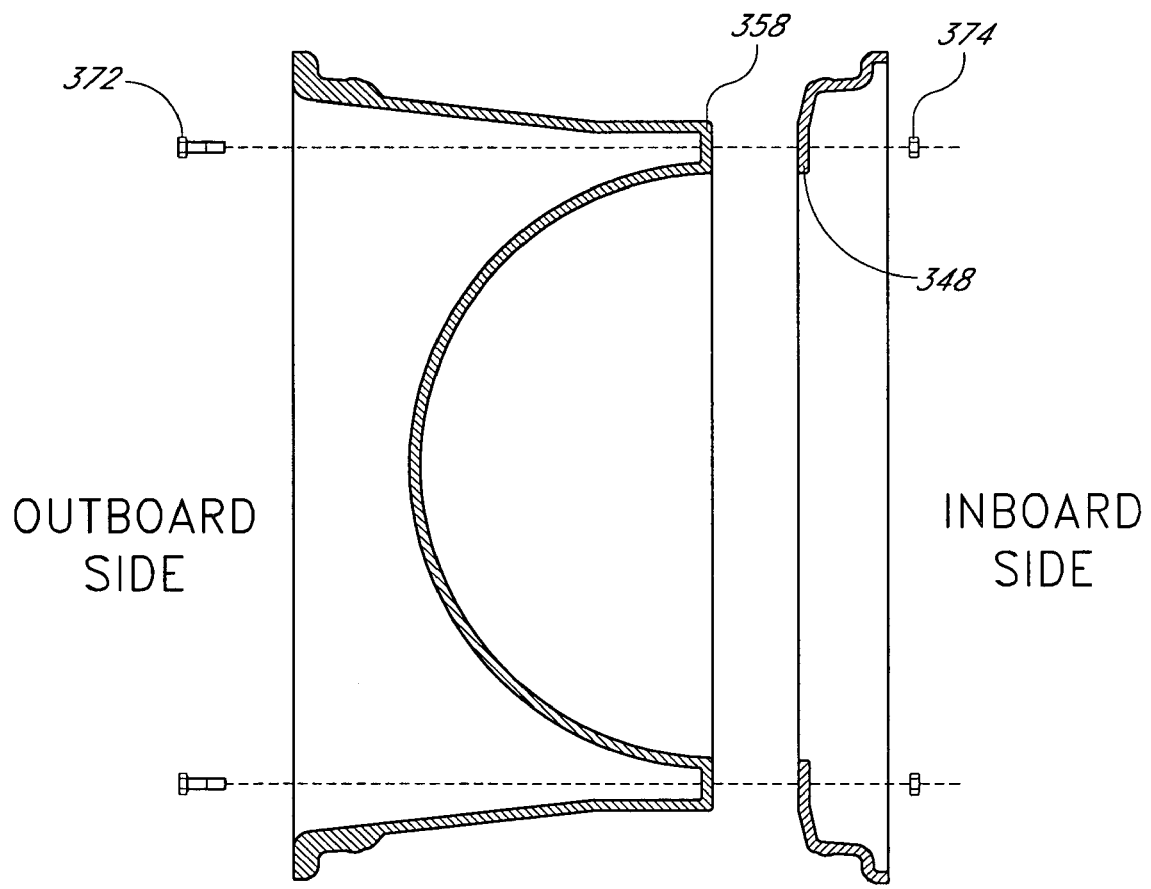
FIG. 3C illustrates an exploded, cross-sectional view of the two-piece wheel of FIGS. 3A and 3B.

FIG. 3C illustrates an exploded, cross-sectional view of the two-piece wheel of FIGS. 3A and 3B. Dashed lines indicated where the bolts and nuts secure the inner and outer pieces of the wheel together to form the functional wheel.

Figure 4A:
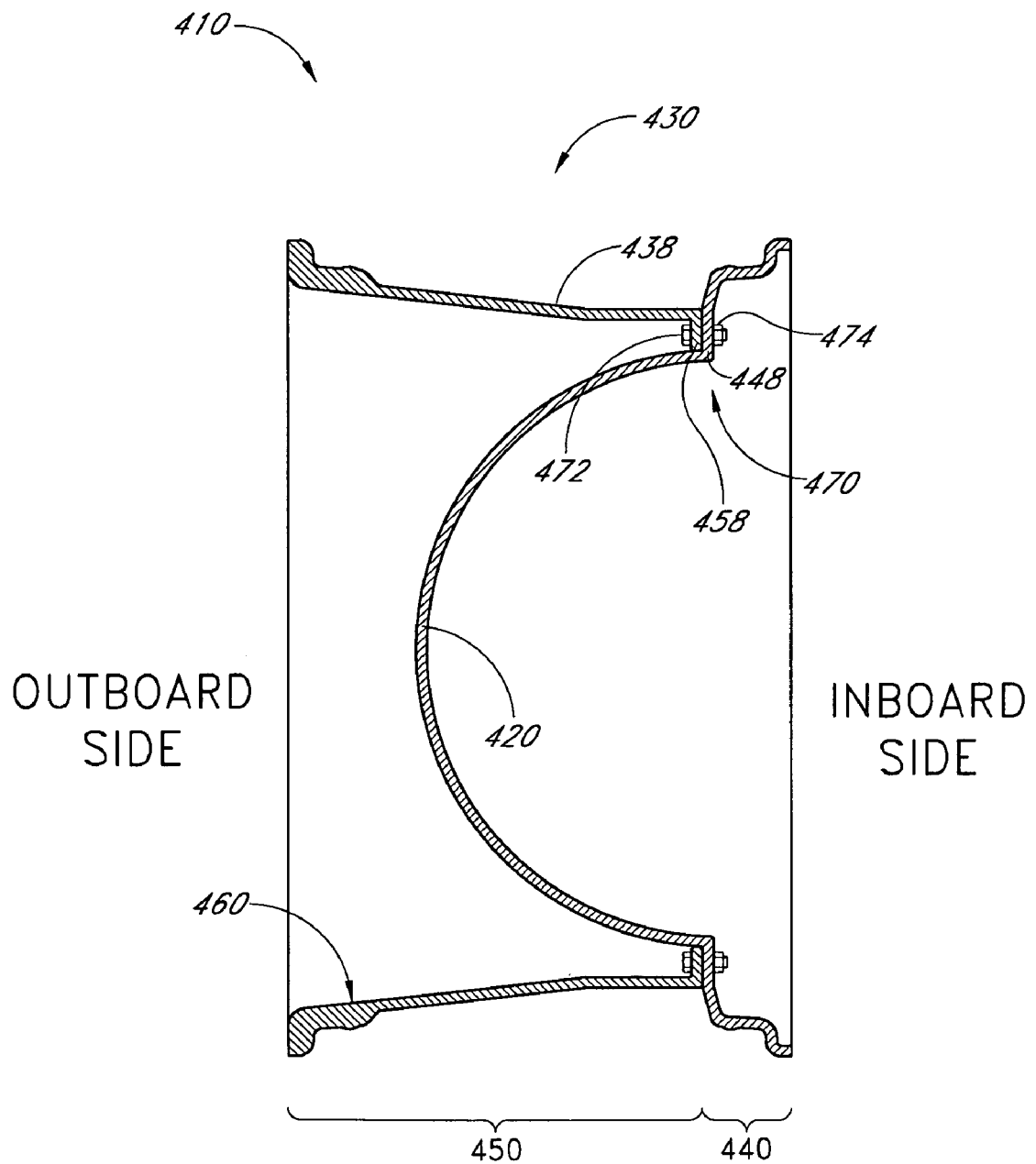
FIG. 4A illustrates a cross-sectional view of another embodiment of a two-piece wheel.

FIG. 4A illustrates a cross-sectional view of another embodiment of a two-piece wheel in accordance with the disclosed inventions. The two-piece wheel 410 comprises an inner 440 and an outer 450. The inner 440 is combined with and forms an integral unit with a center 420. In the illustrated embodiment, the combined inner/center 440/420 and the outer 450 are separate pieces, having a junction 470 where the inner/center 440/420 and the outer 450 converge. In the region of the junction 470, the outer 450 has a rim 458, the inner 440 has a seat 448, and the pieces are held together by at least one bolt 472. Each bolt 472 has a corresponding nut 474 that can be tightened to hold the inner/center 440/420 and outer 450 snugly together. Bolts similar to bolt 472 are disposed at intervals all around a perimeter of the wheel 410 inside (closer to the axis than) the lip 460. Similarly to the wheels illustrated previously, the wheel shown in this illustration is rotationally symmetrical around an axis (not shown), and has an inboard side 414 and an outboard side 412. As with the embodiments illustrated in FIG. 2A and FIG. 3A, the two-piece wheel 410 has a gradual slope 438, a protruding center 420, a smooth lip 460 and an interior lip depth 462. As with the two-piece wheel 310 of FIG. 3A, the heads of bolts 472 may be visible from the outboard side 412, but are preferably somewhat inconspicuous.

In one variation of this embodiment, (not shown) the bolt can be inserted from the inboard side, penetrate the seat 448, and be threadably received by a rim that is thicker than illustrated rim 458. This alternative configuration has the advantage that the bolt does not penetrate through to be seen from the outboard side 412 of the two-piece wheel 410.

Figure 4B:
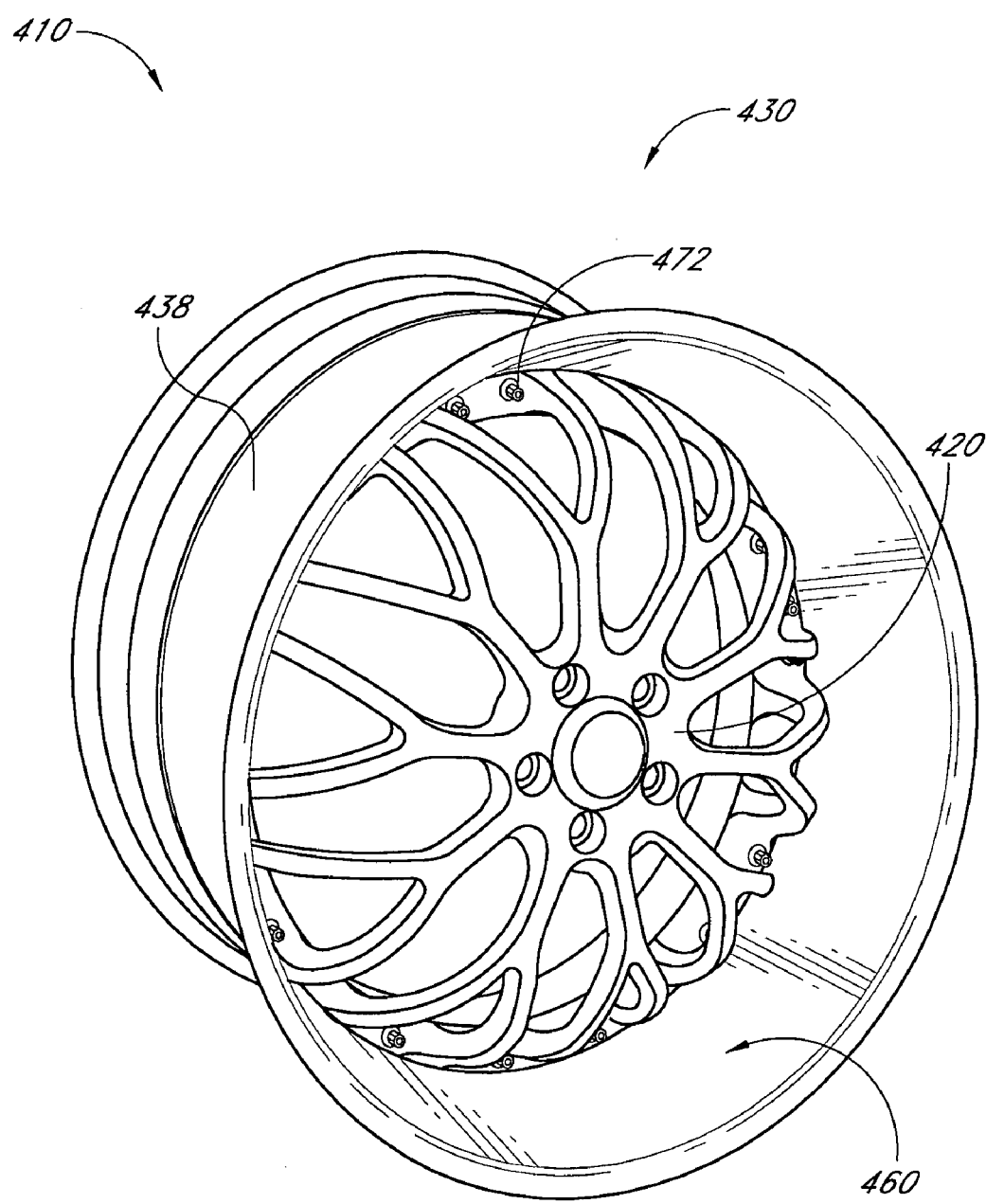
FIG. 4B illustrates a perspective view of the embodiment of FIG. 4A.

FIG. 4B illustrates a perspective view of the embodiment of FIG. 4A showing the wheel 410 as viewed generally from the outboard side 412. In some embodiments, the two-piece construction of the wheel 410 may not be immediately evident from a perspective view, but the multi-piece construction is evident in the illustration. Bolts 472 can be seen between the design contours of the center 420. Furthermore, the seam between the inboard and outboard portions of the barrel 430 is shown to the inboard side of slope 438.

Figure 4C:
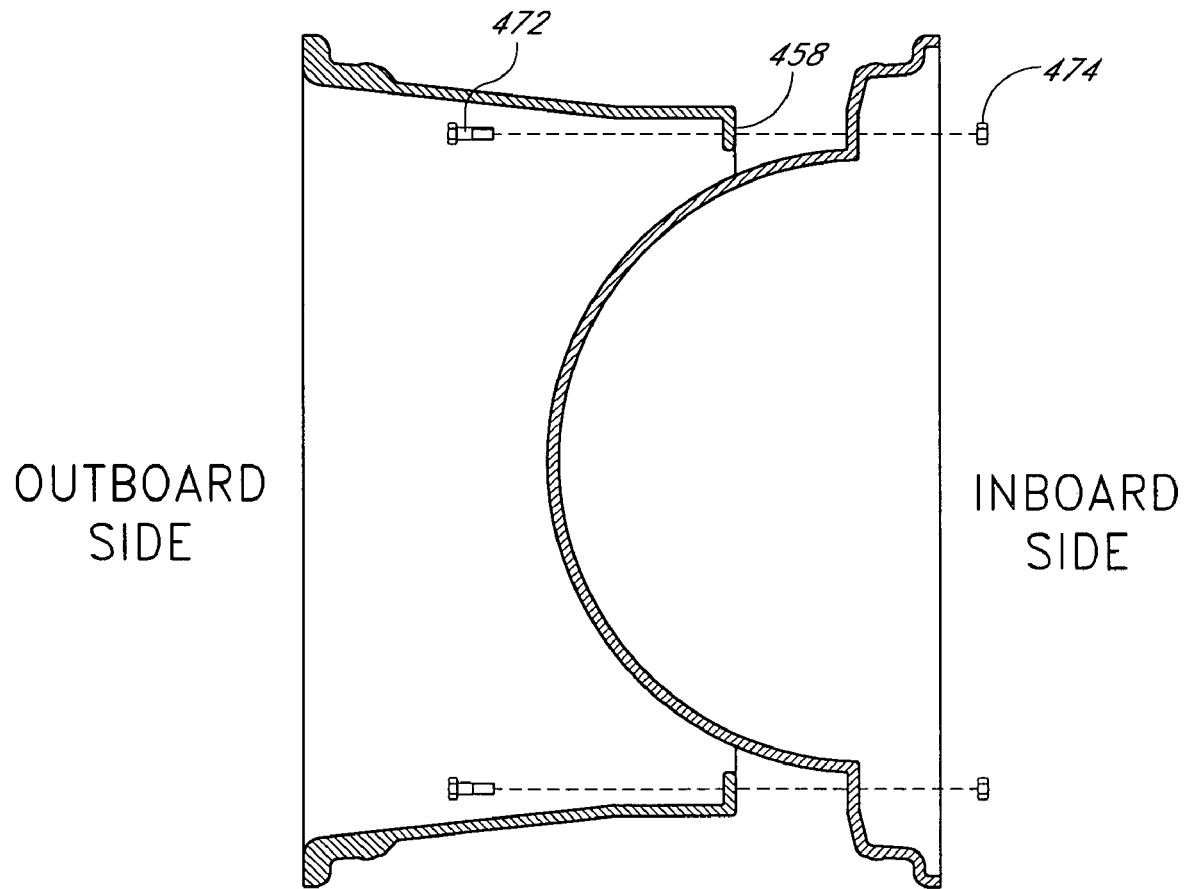
FIG. 4C illustrates an exploded, cross-sectional view of the two-piece wheel of FIGS. 4A and 4B.

FIG. 4C illustrates an exploded, cross-sectional view of the two-piece wheel of FIGS. 4A and 4B. Dashed lines indicated where the bolts and nuts secure the inner and outer pieces of the wheel together to form the functional wheel.

Figure 4D:
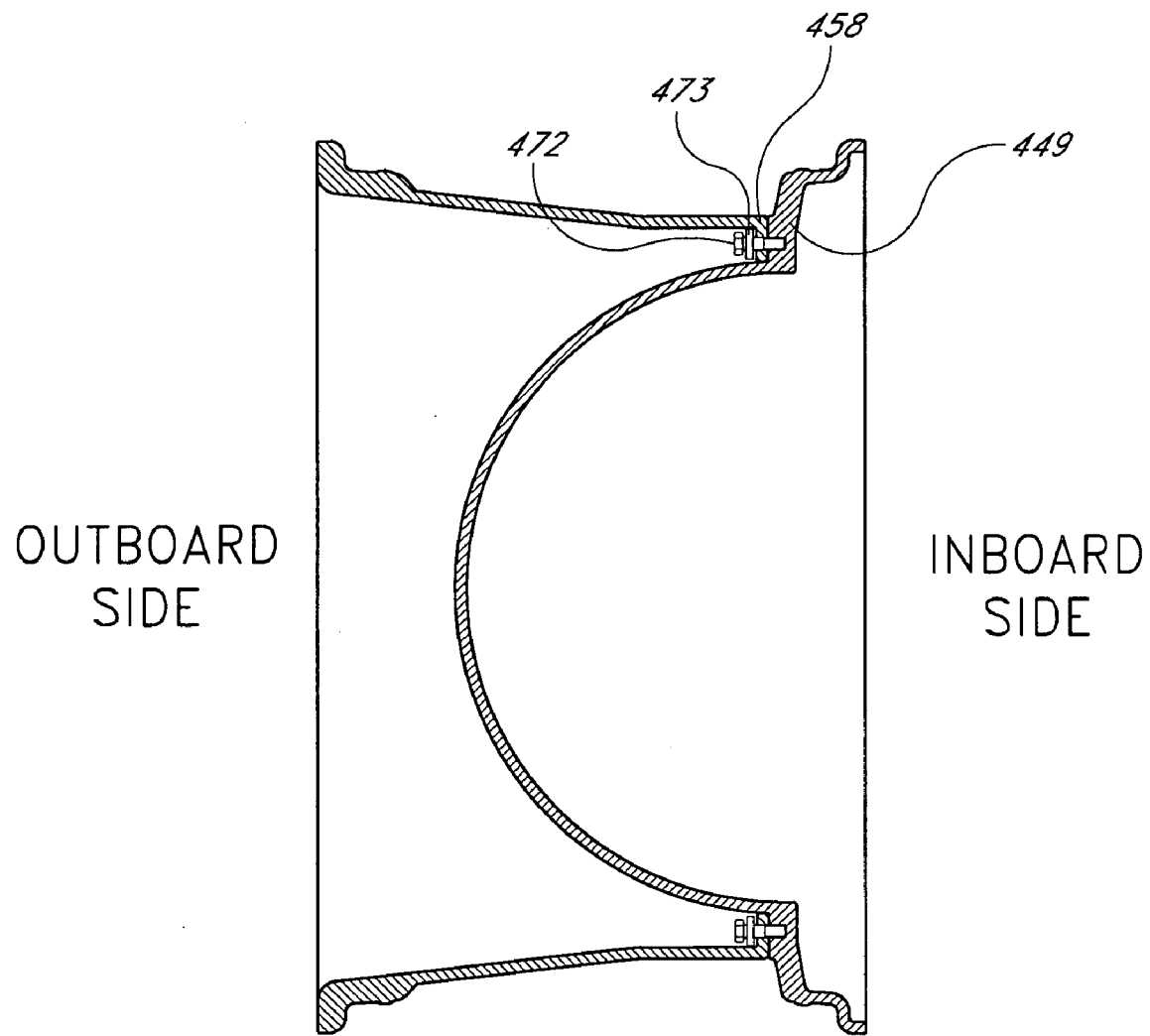
FIG. 4D illustrates a cross-sectional view of another embodiment of a two-piece wheel in accordance with the disclosed inventions.

FIG. 4D illustrates a cross-sectional view of another embodiment of a two-piece wheel in accordance with the disclosed inventions. The illustration shows the bolt 472 penetrating through the rim 458, but not completely penetrating a seat 448. Rather, the bolt is screwed in to a thicker seat 449 that has been tapped such that the threads of the bolt 472 can screw directly into the thicker seat 449, thus eliminating the need for the nut 474. The bolt also penetrates a reinforcing ring 473 that seats against the head of the bolt 472 when the bolt 472 is tightened into place. One or multiple reinforcing rings can be used with any of the embodiments disclosed herein, and can be seated against the head of the bolt, against the nut on the bolt, or anywhere along the length of the bolt.

Figure 5A:
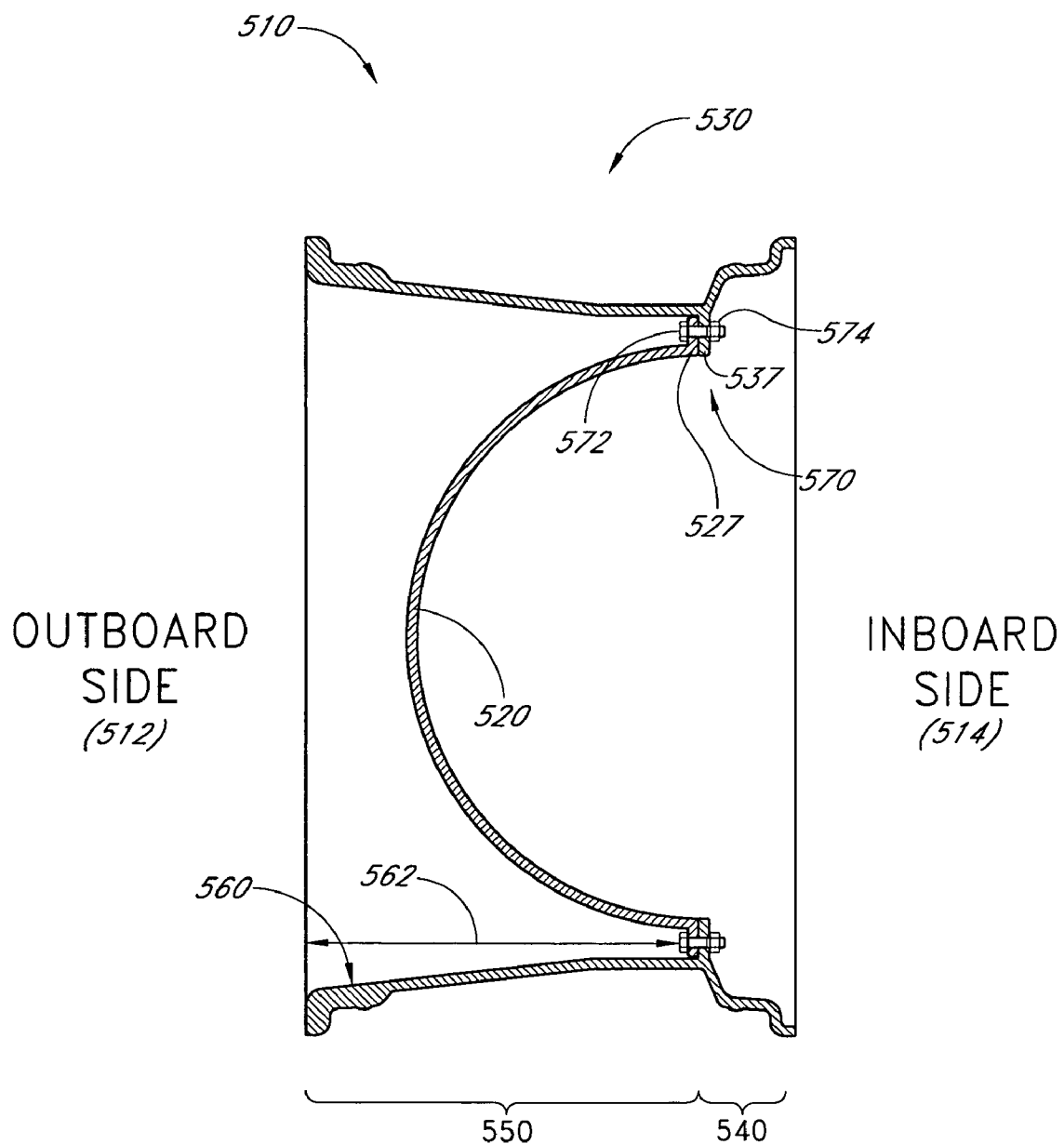
FIG. 5A illustrates a cross-sectional view of another embodiment of a two-piece wheel.

FIG. 5A illustrates a cross-sectional view of another embodiment of a two-piece wheel in accordance with the disclosed inventions. The two-piece wheel 510 comprises a wheel barrel 530 and a wheel center 520. The wheel barrel 530 has an inner region 540 and an outer region 550. In the illustrated embodiment, the barrel 530 and the center 520 are separate pieces, having a junction 570 where the two pieces converge. In the region of the junction 570, the barrel 530 has a rim 537, the center 520 has a rim 527, and the pieces are held together by at least one bolt 572. Each bolt 572 preferably has a corresponding nut 574 that can be tightened to hold the two pieces snugly together. Bolts similar to bolt 572 are disposed at intervals all around a perimeter of the wheel 510 inside (closer to the axis than) the lip 560. Like the wheels illustrated previously, the wheel shown in this illustration is rotationally symmetrical around an axis (not shown), and has an inboard side 514 and an outboard side 512. As with the embodiments illustrated in FIGS. 2-4, the two-piece wheel 510 has a gradual slope 538, a protruding center 520, a smooth lip 560 and an interior lip depth 562.

Figure 5B:
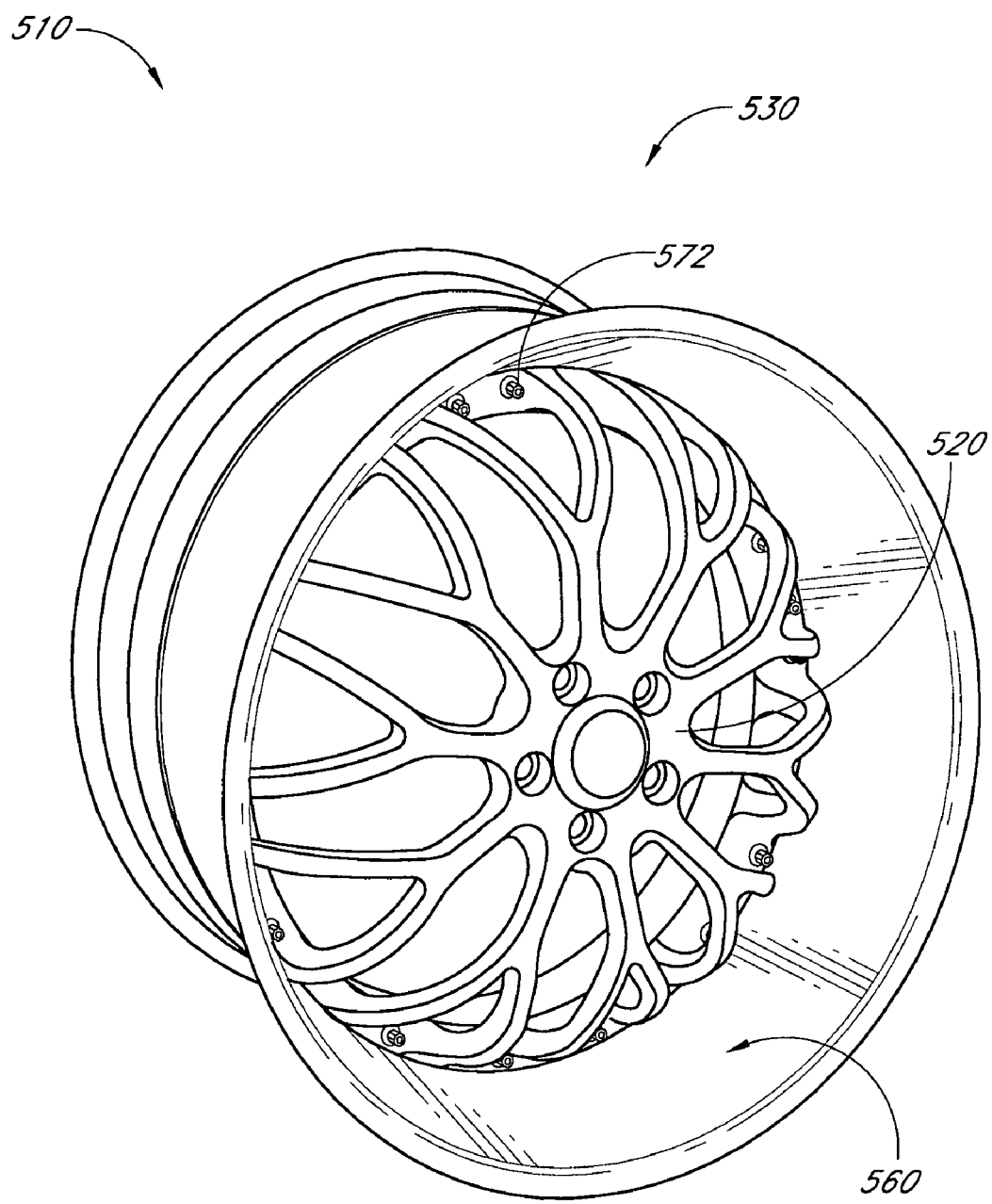
FIG. 5B illustrates a perspective view of the embodiment of FIG. 5A.

FIG. 5B illustrates a perspective view of the embodiment of FIG. 5A showing the wheel 510 as viewed generally from the outboard side 512. In some embodiments, the two-piece construction of the wheel 510 may not be immediately evident from a perspective view. The two-piece construction cannot be easily detected by looking at the exterior surface of the barrel 530, for example, because there is no seam between inboard and outboard portions of the barrel 530. However, bolts 572 are illustrated as seen between the design contours of the center 520.

Figure 5C:
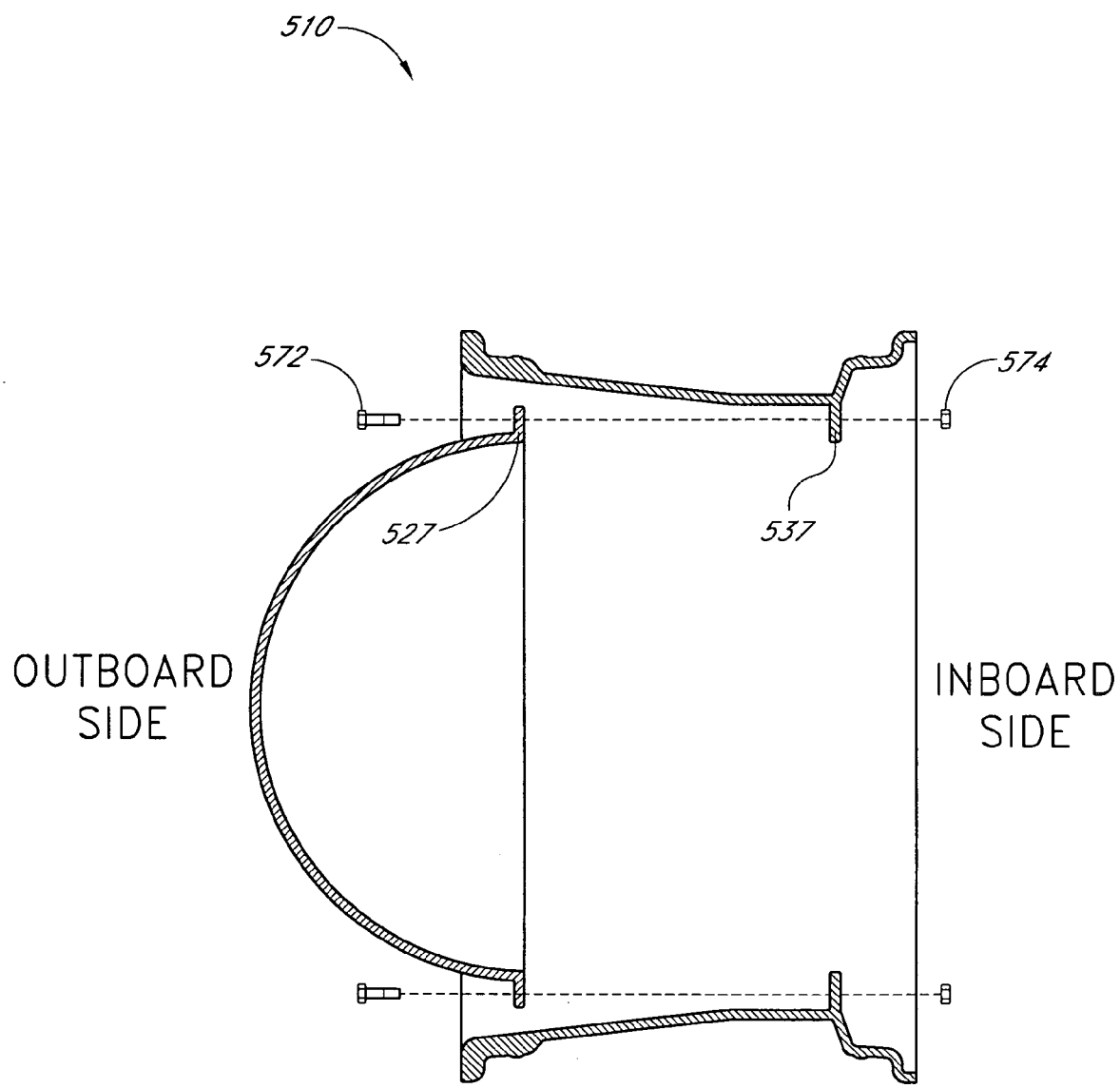
FIG. 5C illustrates an exploded, cross-sectional view of the two-piece wheel of FIGS. 5A and 5B.

FIG. 5C illustrates an exploded, cross-sectional view of the two-piece wheel of FIGS. 5A and 5B. Dashed lines indicated where the bolts and nuts secure the inner and outer pieces of the wheel together to form the functional wheel.

Figure 6A:
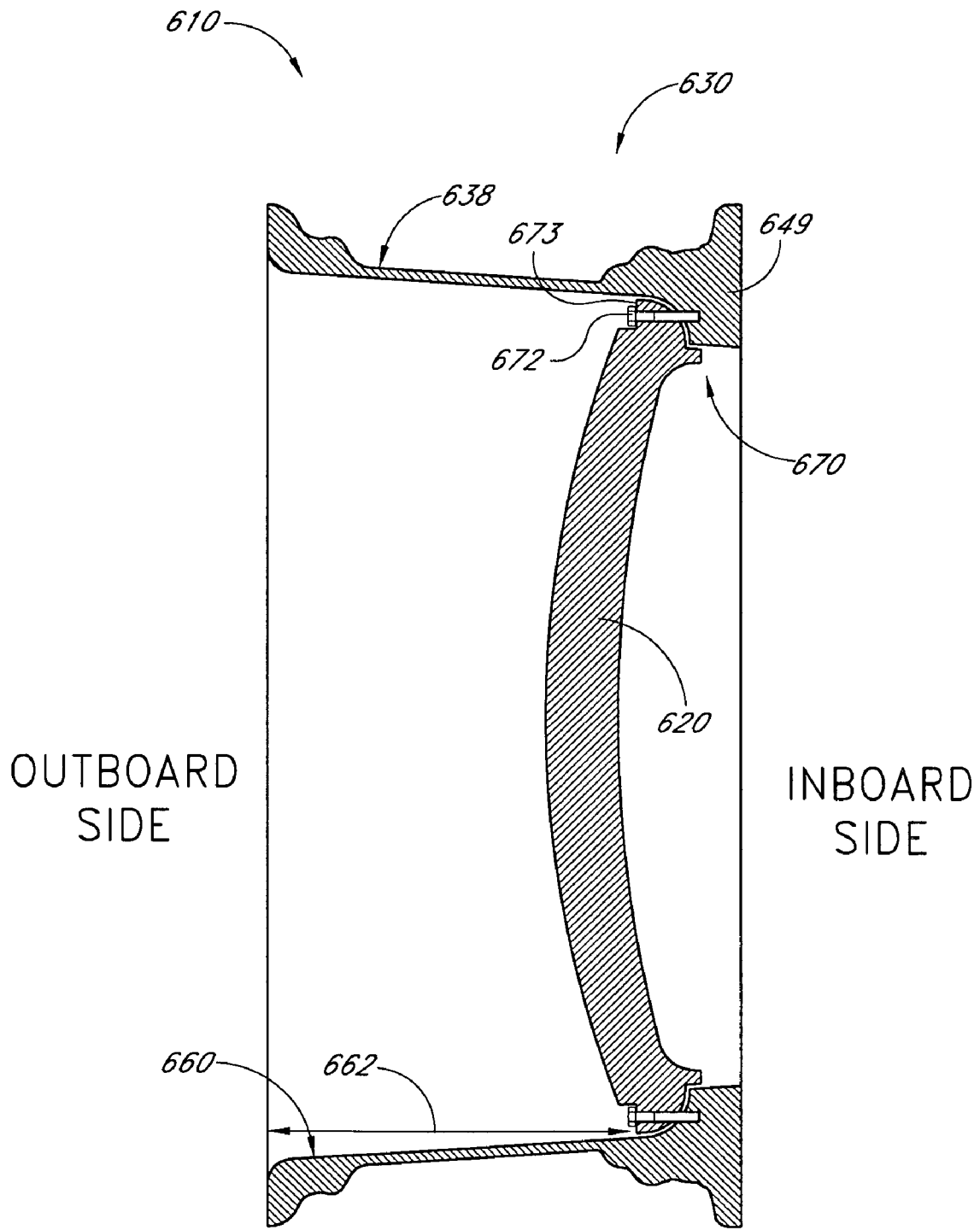
FIG. 6A illustrates a cross-sectional view of another embodiment of a two-piece wheel.

FIG. 6A illustrates a cross-sectional view of another embodiment of a two-piece wheel in accordance with the disclosed inventions. The two-piece wheel 610 comprises a wheel barrel 630 and a wheel center 620. In the illustrated embodiment, the barrel 630 and the center 620 are separate pieces, having a junction 670 where the two pieces converge. At or near the junction 670, the barrel 630 has a thickened region 649, the center 620 has a bolt seat 673, and the pieces are held together by at least one bolt 672. Each bolt 572 preferably penetrates through the center 620, but does not extend completely through the thickened region 649. The bolt 672 is threadably received in the thickened region 649 that has been tapped such that the threads of the bolt 672 can screw directly into it. Bolts similar to bolt 672 are preferably disposed at intervals all around a perimeter of the wheel 610 inside (closer to the axis than) the lip 660. Similarly to the wheels illustrated previously, the wheel shown in this illustration is rotationally symmetrical around an axis (not shown), and has an inboard side 614 and an outboard side 612. If appropriate materials and structure are used, the regions 649 and 620 need not be thicker than other structures shown in FIG. 6A.

As with the embodiments illustrated in FIGS. 2-5, the two-piece wheel 610 has a gradual slope 638, a curved center 620, a smooth lip 660 and an interior lip depth 662. However, the center 620 is not as highly curved as in some of the other illustrated embodiments. Some vehicles do not require as much room for the mechanical components to the inboard side of the wheel center. Any of the illustrated embodiments can have centers that are not as highly curved if the vehicle components allow such an adjustment.

Figure 6B:
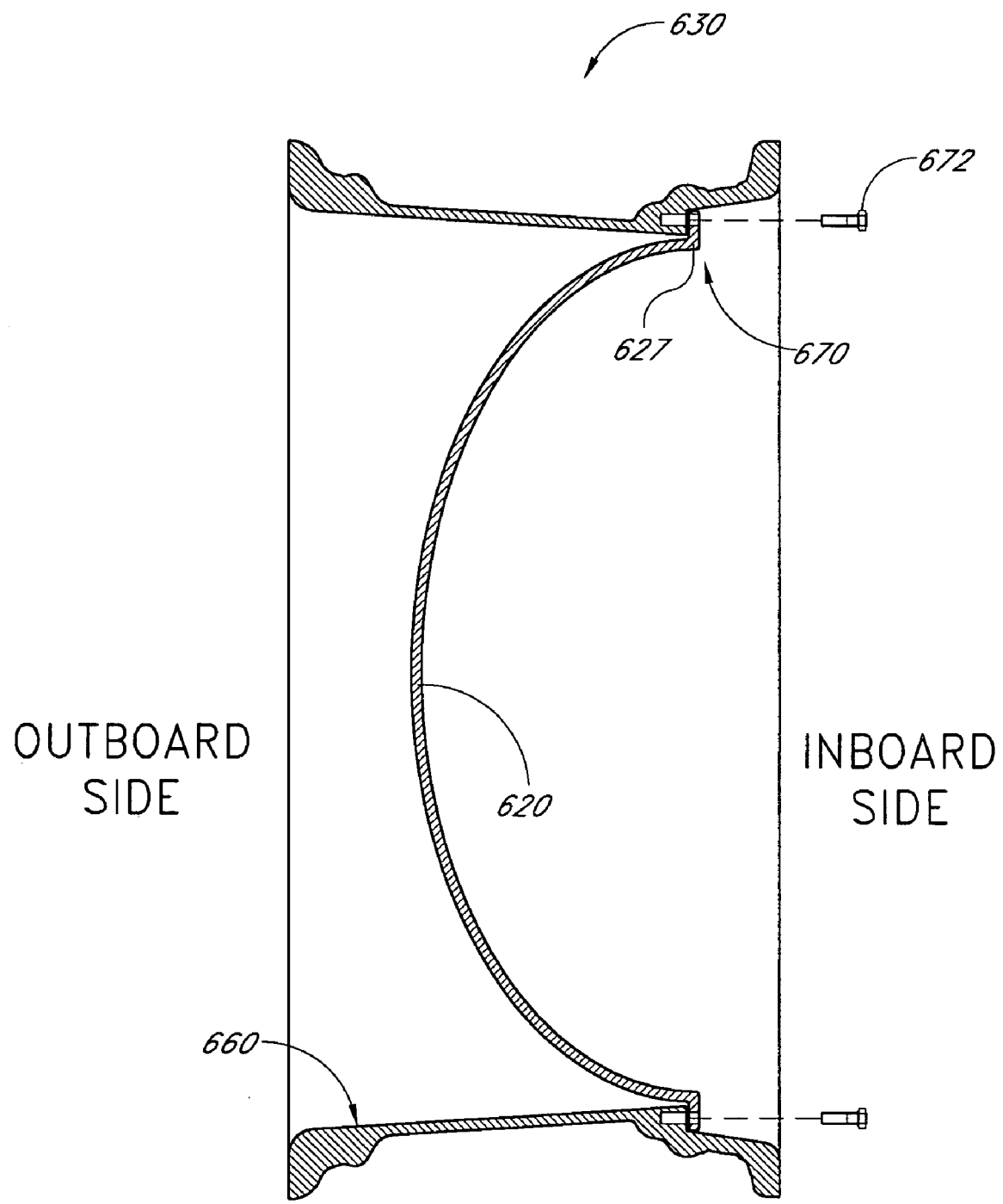
FIG. 6B illustrates another embodiment of a two-piece wheel.

FIG. 6B illustrates another embodiment of a two-piece wheel. The bolt 672 is inserted from the inboard side 614, penetrates the rim 627, and is threadably received by a thickened region in the wheel barrel 630. This configuration has the advantage that the bolt does not penetrate through to be seen from the outboard side 612.

Figure 6C:
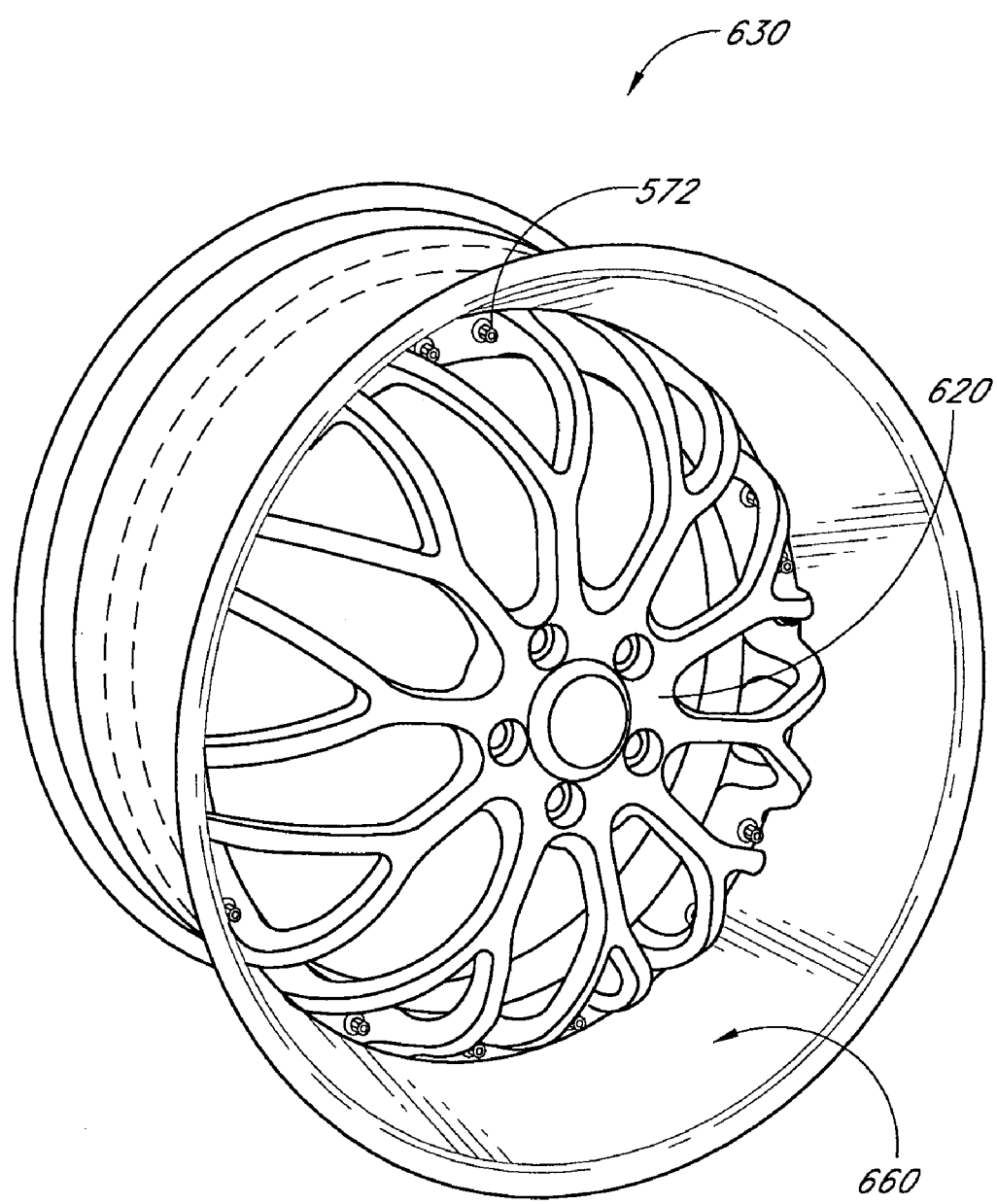
FIG. 6C is a perspective view of the embodiment of FIG. 6B.

FIG. 6C is a perspective view of an embodiment having many of the features illustrated in FIG. 6B. FIG. 6C shows a wheel as viewed generally from the outboard side 612. The bolts are not visible from the outboard side of the wheel. However, the contours of the junction region of the barrel 630 are illustrated in this perspective view. These contours provide the barrel 630 with sufficient thickness to threadably receive the bolts 672 from the inboard side, as illustrated in FIG. 6B.

Figure 7A:
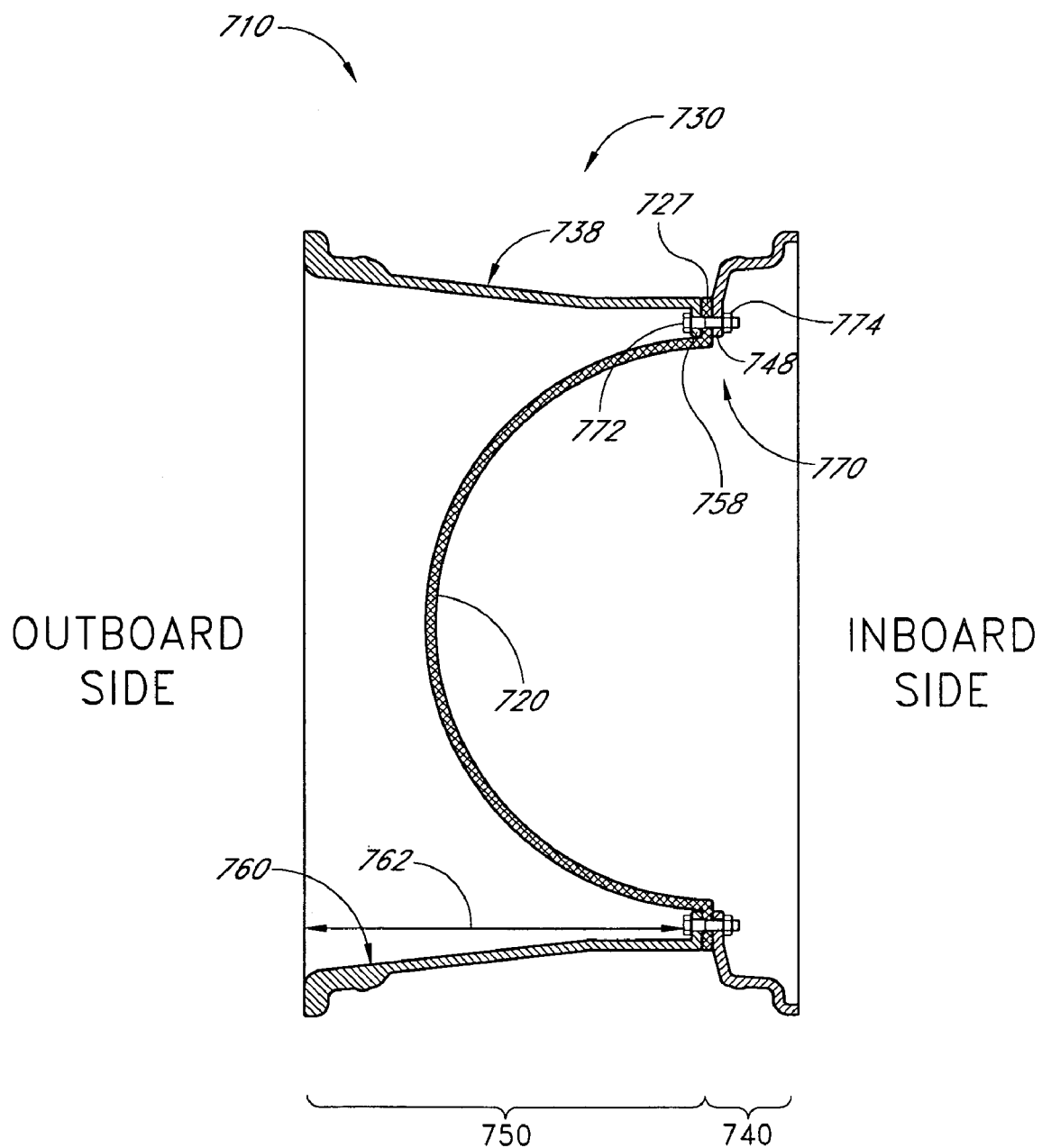
FIG. 7A illustrates a cross-sectional view of an embodiment of a three-piece wheel.

FIG. 7A illustrates a cross-sectional view of an embodiment of a three-piece wheel. The three-piece wheel 710 comprises an inner 740, an outer 750, and a center 720. The outer 750 and the inner 740 are separate pieces, but together they form the barrel 730. The three separate pieces have a junction 770 where the inner 740, the outer 750, and the center 720 converge. In the region of the junction 770, the outer 750 has a rim 758, the inner 740 has a rim 748, and the center 720 has a rim 772. The pieces are preferably held together by at least one bolt 772. Each bolt 772 preferably has a corresponding nut 774 that can be tightened to hold the three pieces snugly together. Bolts similar to bolt 772 are disposed at intervals all around a perimeter of the wheel 710 inside (closer to the axis than) the lip 760. As with the wheel illustrated in previous figures, the cross-section shown in this illustration is rotationally symmetrical around an axis (not shown), and has an inboard side 714 and an outboard side 712. As with embodiments illustrated in previous figures, the three-piece wheel 710 has a gradual slope 738, a protruding center 720, a smooth lip 760 and an interior lip depth 762.

Figure 7B:
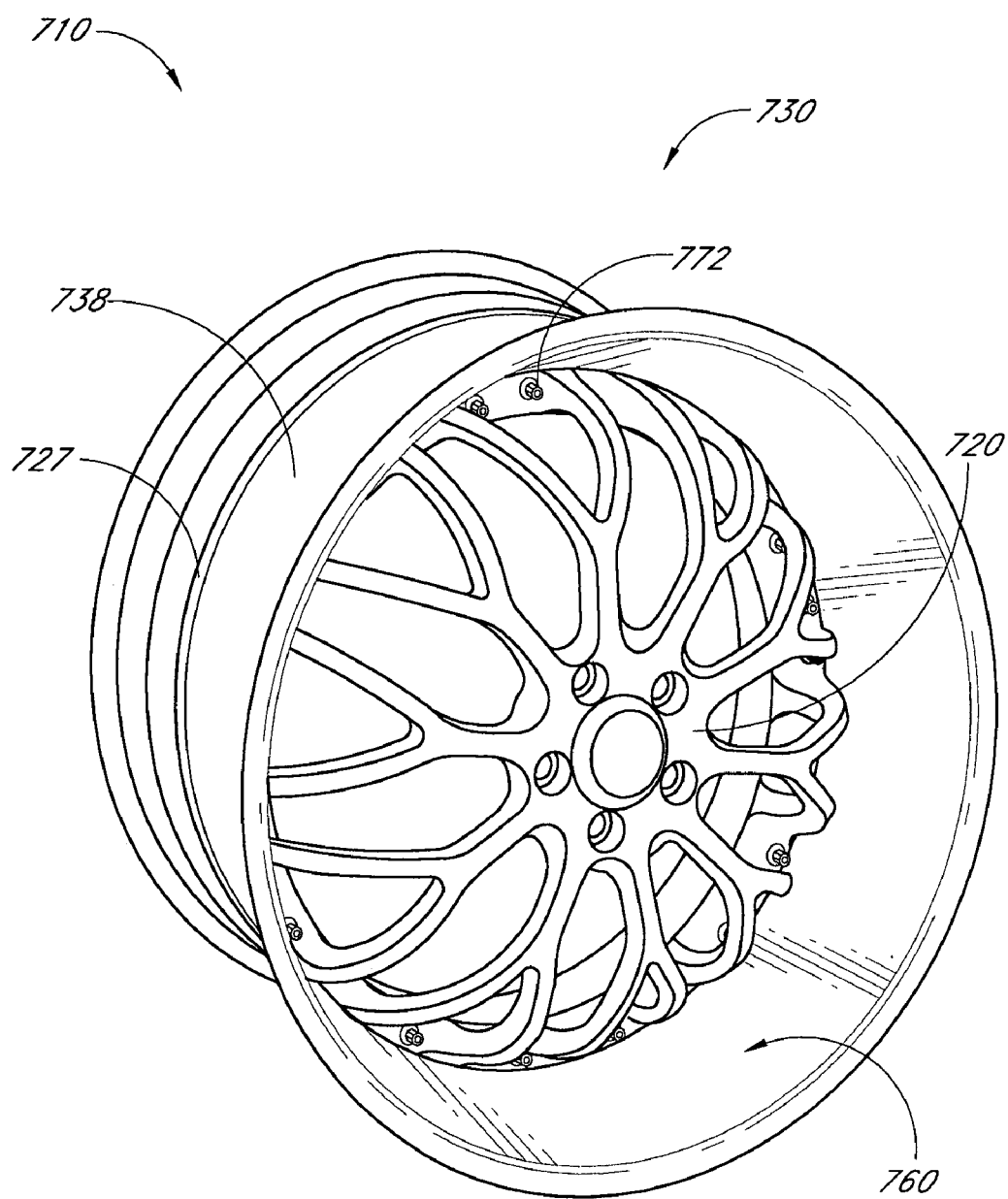
FIG. 7B illustrates a perspective view of the embodiment of FIG. 7A.

FIG. 7B illustrates a perspective view of an embodiment having some of the characteristics of FIG. 7A. In certain embodiments, the three-piece construction of the wheel 710 may not be immediately evident from a plan view of the face of the wheel 710. However, the perspective view illustrated by FIG. 7B does show a portion of rim 727 at the inboard side of slope 738, sandwiched between the inner 740 and outer 750. Bolts 772 are also visible in this illustration.

Figure 7C:
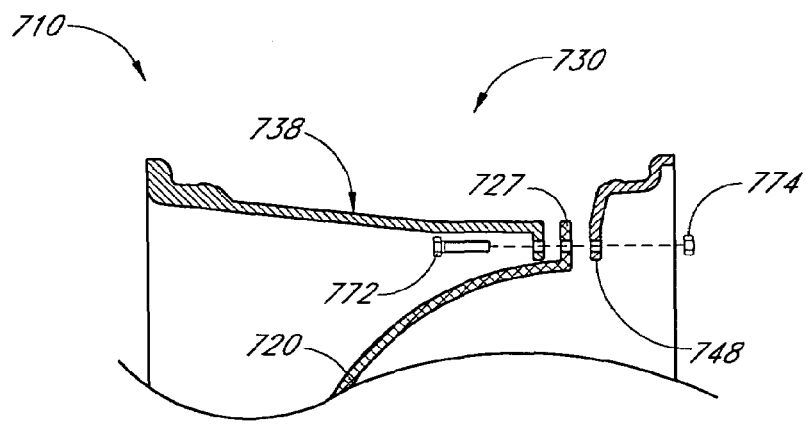
FIG. 7C illustrates an exploded, cross-sectional, detail view of the junction region of the embodiment of FIGS. 7A and 7B.

FIG. 7C illustrates an exploded, cross-sectional, detail view of the junction region of the embodiment of FIGS. 7A and 7B. The relative lengths of rims 758, 727, and 748 are configured to come together in a complementary fashion as shown. In this embodiment, rim 758 is located at the apical end of a generally frustoconical region of the wheel barrel 730 corresponding to slope 738. Rim 758 is configured to fit snugly against rim 727 that runs all around the edge of the wheel center 720. Rim 758 is, in turn, configured to snugly seat against rim 748. When these three rims are properly aligned, bolts 772 can be threaded through the holes and tightened using nuts 774.

Figure 7D:
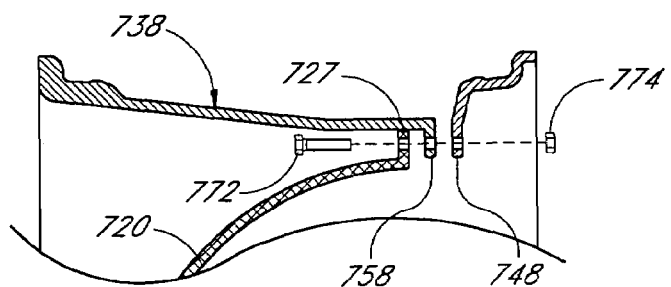
FIGS. 7D and 7E illustrate exploded, cross-sectional, detail views of the junctions between the three pieces of alternative embodiments of three-piece wheels.
Figure 7E:
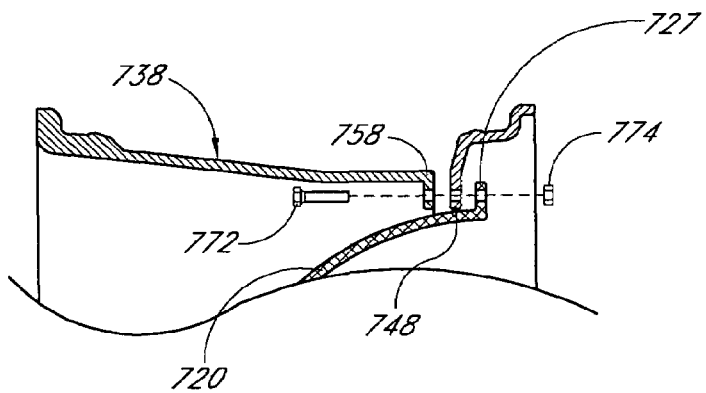

FIGS. 7D and 7E illustrate exploded, cross-sectional, detail views of the junctions between the three pieces of alternative embodiments of improved three-piece wheels. Each figure shows how the various rims can be variously arranged in complementary configurations. In addition, each figure indicates a preferred placement of the bolts and nuts that join the various wheel components together. The different wheel configurations have different advantages. For example, the wheel of FIG. 7E, where the wheel center 720 is in the farthest inboard position, has the advantage of allowing the center to be removed without completely removing bolts 772 and de-coupling the inboard and outboard portions of the barrel 730. Depending on the reason for removal, the different wheel pieces might be positioned to be most or least accessible. For example, such a multi-piece wheel may be mounted on a racing vehicle. If during a pit stop the vehicle's wheels needed to be replaced or repaired, the ability to efficiently remove a desired component quickly may be advantageous.

Variations of the embodiments illustrated in FIGS. 7A-7E could provide a thicker rim region at the opposite side from the head of the bolt 772 and threading a hole in the rim region to receive the bolt in a way similar to that described in previous embodiments, thus eliminating the need for a nut. Alternatively, bolts 772 could be inserted from the inboard side of the wheel 710 so that nuts 774 were screwed on from the outboard side of the wheel 710.

Figure 8:
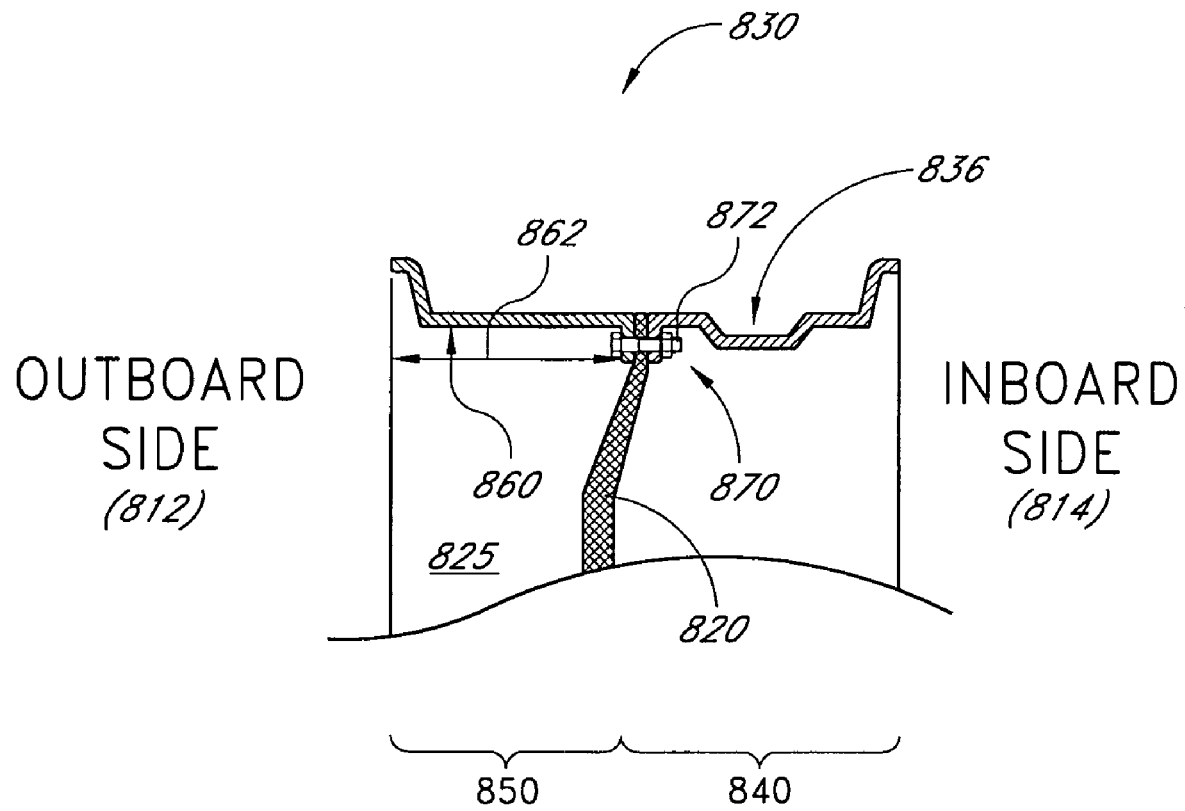
FIG. 8 illustrates a cross-sectional view of a multi-piece wheel.

FIG. 8 illustrates a partial cross-sectional view of a multi-piece wheel. The wheel barrel 830 is generally cylindrical in shape and the lip 860 does not have a gradual slope toward the wheel's axis (not shown) in the inboard direction. Furthermore, the mounting drop 836 is located to the inboard side 814 of the wheel center. In general, this configuration limits the depth of the wheel's design volume 825. The axially protruding bump on the radially inward side of the mounting drop 836 does not allow the wheel center to be moved farther to the inboard side 814. The bolt 872 extends toward the inboard side 814 of the wheel barrel 830, limiting the interior lip depth 862 at which the wheel center junction can be placed without the bolt 872 abutting the axial side of the mounting drop 836.

The mounting drop 836 is a distinct groove with two walls. Furthermore, the mounting drop 836 is entirely contained within the inner 840; the mounting drop 836, including its two vertical walls, has been formed continuously with no seams in the metal surface. That is, the junction 870 between the inner 840, outer 850, and center 820 does not overlap with any region of the mounting drop 836.

Figure 9A:
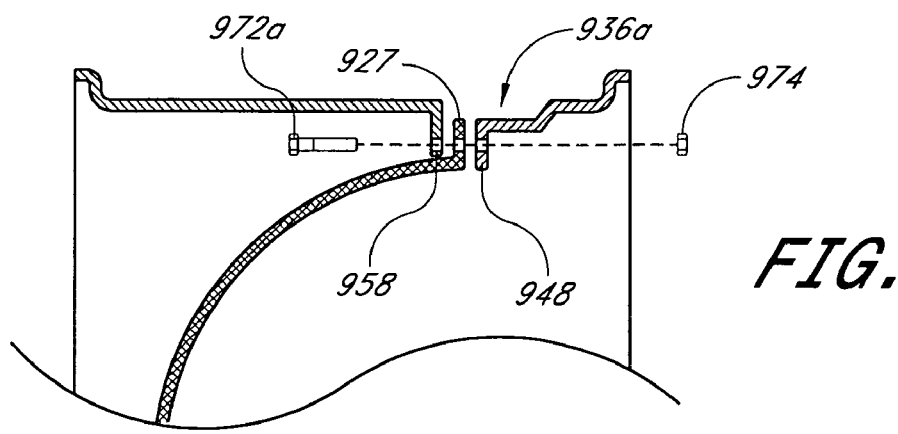
FIG. 9A illustrates a cross-sectional view of the junction between the pieces of a multi-piece wheel.
Figure 9B:
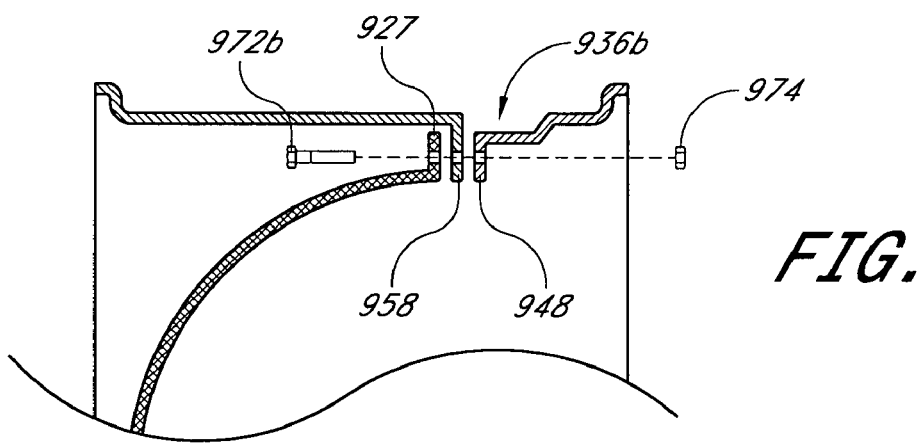
FIG. 9B illustrates a cross-sectional view of the junction between the pieces of a multi-piece wheel.
Figure 9C:
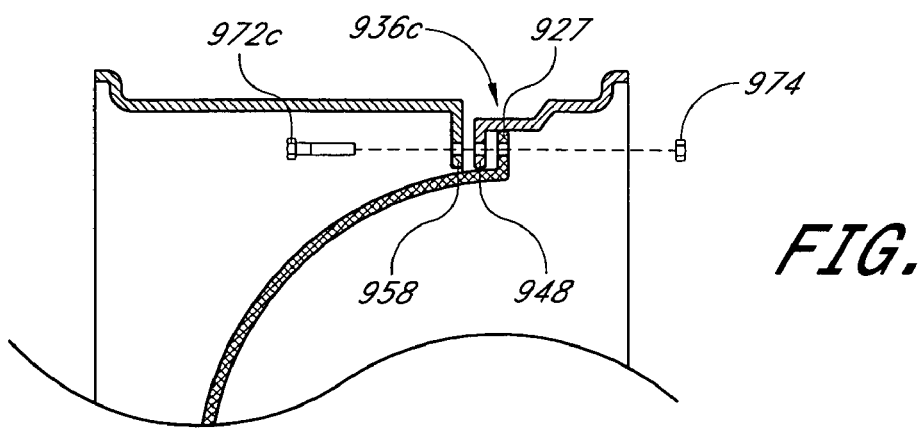
FIG. 9C illustrates a cross-sectional view of the junction between the pieces of a multi-piece wheel.

FIGS. 9A, 9B, and 9C illustrates a partial cross-sectional view of the junction between the pieces of a three-piece wheel in accordance with an embodiment of the disclosed inventions. The bolts 972a, 972b, and 972c are situated axially inwardly of, and at a smaller diameter than the mounting drops 936a, 936b, and 936c. The advantageous placement of the bolt 972 is made possible because in each of the illustrated embodiments, the extended rim 958 forms the outboard wall of the mounting drop 936. Because the rims 958, 927, and 948 themselves form various aspects of the mounting drop, while also allowing bolts 972 to fasten the wheel components together without interference, these configurations provide potentially greater interior lip depth than does the configuration of FIG. 8.

FIG. 9B illustrates a partial cross-sectional view of the junction between the pieces of a three-piece wheel in accordance with another embodiment. In this configuration, rim 958 is extended and forms the outboard wall of mounting drop 936. It has advantages similar to those illustrated in FIG. 9A, with the additional advantage that only one seam between wheel components is incorporated into the mounting drop 936.

FIG. 9C illustrates a partial cross-sectional view of the junction between the pieces of a three-piece wheel in accordance with another embodiment. In this configuration, rim 958 is extended and forms the outboard wall of mounting drop 936. It has advantages similar to those illustrated in FIG. 9B.

The foregoing description sets forth various preferred embodiments and other exemplary but non-limiting embodiments of the inventions disclosed herein. While the description gives some details regarding illustrative combinations and modes of the disclosed inventions, other variations, combinations, modifications, modes, and/or applications of the disclosed features and aspects of the embodiments are also within the scope of this disclosure, including those that become apparent to those of skill in the art upon reading this specification. In particular, it is contemplated that the various materials, dimensions, angles, shapes, sizes, and structures of each of the different disclosed embodiments may be used interchangeably and/or combined to form other embodiments. The scope of the inventions claimed herein is not limited by the foregoing description; rather, the scope is limited only by the appended claims.

The invention claimed is:

1. A wheel configured to be mounted to a vehicle, the wheel comprising:
   (a) a substantially circular inboard rim adapted to form a seal against a tire wall;
   (b) a substantially circular outboard rim adapted to form a seal against a tire wall;
   (c) a wheel barrel comprising an exterior surface and an interior surface, the wheel barrel extending between the inboard and outboard rims, and the interior surface of the wheel barrel comprising a first diameter near the outboard rim and a second diameter near the inboard rim, the first diameter being larger than the second diameter so that a majority of the interior surface between the inboard rim and the outboard rim comprises a substantially frusto-conical shape; and
   (d) a wheel center, attached to the interior surface of the wheel barrel near the inboard rim, wherein at least a portion of the wheel center is positioned closer to the outboard rim than the inboard rim.

2. The wheel of claim 1 wherein a majority of the surface area of the wheel center has a curved shape.

3. The wheel of claim 1 wherein a portion of the wheel center is positioned near the outboard rim.

4. The wheel of claim 1 wherein the inboard and outboard rims have approximately the same diameter.

5. The wheel of claim 1 wherein the ratio of the distance between the outboard and inboard rims and the distance from the outboard rim to the point of attachment of the wheel center is between about 1 and 1.35.

6. The wheel of claim 5 wherein the ratio of the distance between the outboard and inboard rims and the distance between the inboard rim to the further inboard point on the wheel center is between about 1 and 1.25.

7. The wheel of claim 1 wherein the wheel comprises separable inner and outer portions.

8. The wheel of claim 7 wherein the curved wheel center is unitary with the outer portion of the wheel.

9. The wheel of claim 1 wherein the wheel center is unitary with the outer portion of the wheel.

10. The wheel of claim 1 wherein the wheel center is separable from the wheel barrel.

11. The wheel of claim 1, wherein the interior surface of the wheel barrel comprises a substantially linear slope from the first diameter to the second diameter.

12. The wheel of claim 1, wherein the entirety of the interior surface of the wheel barrel comprises a substantially frusto-conical shape.

* * * * *

UNITED STATES PATENT AND TRADEMARK OFFICE
CERTIFICATE OF CORRECTION

PATENT NO. : 7,270,382 B2 Page 1 of 1
APPLICATION NO. : 10/970646
DATED : September 18, 2007
INVENTOR(S) : Frank J. Hodges and Sergiu Anca It is certified that error appears in the above-identified patent and that said Letters Patent is hereby corrected as shown below:

Title Page, Item (56) (Other Publications), Line 1, delete "www.aarims.com" and insert --www.aaarims.com-- therefor.

Column 14, Line 30 (approximately), in Claim 1, after "wheel" delete "center," and insert --center-- therefor.

Signed and Sealed this

Fourth Day of March, 2008

JON W. DUDAS
*Director of the United States Patent and Trademark Office*